US011424885B2

(12) United States Patent
Wu et al.

(10) Patent No.: US 11,424,885 B2
(45) Date of Patent: Aug. 23, 2022

(54) METHOD AND DEVICE USED IN UE AND BASE STATION FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 42 days.

(21) Appl. No.: 17/098,334

(22) Filed: Nov. 14, 2020

(65) Prior Publication Data

US 2021/0067293 A1 Mar. 4, 2021

Related U.S. Application Data

(63) Continuation of application No. PCT/CN2020/081012, filed on Mar. 25, 2020.

(30) Foreign Application Priority Data

Apr. 11, 2019 (CN) ......................... 201910288780.7

(51) Int. Cl.
*H04W 72/04* (2009.01)
*H04L 5/00* (2006.01)
*H04L 25/02* (2006.01)

(52) U.S. Cl.
CPC ........ *H04L 5/0048* (2013.01); *H04L 25/0202* (2013.01); *H04W 72/0446* (2013.01); *H04W 72/0453* (2013.01)

(58) Field of Classification Search
CPC . H04L 5/0048; H04L 25/0202; H04L 5/0005; H04L 5/0051; H04L 5/0053;
(Continued)

(56) References Cited

U.S. PATENT DOCUMENTS

2013/0343329 A1* 12/2013 Papasakellariou .... H04W 16/02 370/329
2015/0043466 A1* 2/2015 Yoshida ................ H04W 72/04 370/329
(Continued)

FOREIGN PATENT DOCUMENTS

CN 101128028 A 2/2008
CN 101145828 A 3/2008
(Continued)

OTHER PUBLICATIONS

ISR in application PCT/CN2020/081012 dated Jun. 3, 2020.
(Continued)

*Primary Examiner* — Jay P Patel

(57) ABSTRACT

The present disclosure provides method and device used in UE and base station for wireless communication. A UE receives a first signaling and then operates N radio signals respectively in N time-frequency resource blocks. The first signaling indicates N1 time-frequency resource blocks; the N1 time-frequency resource blocks respectively belong to N1 frequency sub-bands in frequency domain; any of the N time-frequency resource blocks is one of the N1 time-frequency resource blocks, N being a positive integer greater than 1 and no greater than N1; the N radio signals respectively comprise N first-type reference signals, and an antenna port for transmitting each of the N first-type reference signals is associated with a first antenna port.

20 Claims, 17 Drawing Sheets

(58) Field of Classification Search
CPC ............. H04L 5/0094; H04L 25/0226; H04W 72/0446; H04W 72/0453; H04W 72/042
See application file for complete search history.

(56) References Cited

U.S. PATENT DOCUMENTS

| | | | | |
|---|---|---|---|---|
| 2015/0296357 | A1* | 10/2015 | Hooli | H04W 72/0426 455/404.1 |
| 2015/0312958 | A1* | 10/2015 | Cheng | H04L 5/0048 370/252 |
| 2015/0382371 | A1* | 12/2015 | Liu | H04B 7/0626 370/329 |
| 2016/0056977 | A1* | 2/2016 | Wang | H04L 5/0048 370/336 |
| 2016/0073415 | A1* | 3/2016 | Rahman | H04L 25/0228 370/329 |
| 2016/0359601 | A1* | 12/2016 | Xu | H04L 5/0048 |
| 2017/0311332 | A1* | 10/2017 | Hong | H04L 5/0048 |
| 2017/0359766 | A1* | 12/2017 | Agiwal | H04L 27/26 |
| 2018/0054237 | A1* | 2/2018 | Tseng | H04W 72/085 |
| 2018/0063757 | A1* | 3/2018 | Gormley | H04W 88/08 |
| 2018/0070369 | A1* | 3/2018 | Papasakellariou | H04W 72/1215 |
| 2018/0091350 | A1 | 3/2018 | Akkarakaran et al. | |
| 2018/0123625 | A1* | 5/2018 | Lee | H04W 28/02 |
| 2019/0149289 | A1* | 5/2019 | Abedini | H04L 1/0003 370/252 |
| 2019/0373551 | A1* | 12/2019 | Sundberg | H04L 5/0044 |
| 2019/0387533 | A1* | 12/2019 | Papasakellariou | H04W 56/00 |
| 2020/0059867 | A1* | 2/2020 | Haghighat | H04W 52/42 |
| 2020/0067628 | A1* | 2/2020 | Xu | H04L 5/0048 |
| 2020/0145132 | A1* | 5/2020 | Jiang | H04W 72/0446 |
| 2020/0252882 | A1* | 8/2020 | Charipadi | H04W 52/245 |
| 2020/0295898 | A1* | 9/2020 | Jiang | H04W 24/10 |
| 2020/0314881 | A1* | 10/2020 | Bagheri | H04L 5/0051 |
| 2020/0403762 | A1* | 12/2020 | Jiang | H04L 5/001 |
| 2021/0029673 | A1* | 1/2021 | Zhang | H04W 72/02 |
| 2021/0410084 | A1* | 12/2021 | Li | H04W 52/265 |

FOREIGN PATENT DOCUMENTS

| | | | | |
|---|---|---|---|---|
| CN | 107453840 | A | 12/2017 | |
| CN | 107483166 | A | 12/2017 | |
| EP | 2253115 | A1 | 11/2010 | |
| WO | 2018171800 | A1 | 9/2018 | |
| WO | WO-2018165987 | A1 * | 9/2018 | H04L 5/0007 |
| WO | WO-2018196529 | A1 * | 11/2018 | H04L 5/00 |
| WO | 2019028885 | A1 | 2/2019 | |
| WO | 2019047090 | A1 | 3/2019 | |
| WO | WO-2019149242 | A1 * | 8/2019 | H04L 5/0025 |

OTHER PUBLICATIONS

CN 1st Office Action received in application No. 201910288780.7 dated Jun. 14, 2022.

CN 1st Search Report received in application No. 201910288780.7 dated Jun. 7, 2022.

* cited by examiner

METHOD AND DEVICE USED IN UE AND BASE STATION FOR WIRELESS COMMUNICATION

CROSS REFERENCE TO RELATED APPLICATIONS

This application is a continuation of International Application No. PCT/CN2020/081012, filed Mar. 25, 2020, claims the priority benefit of Chinese Patent Application No. 201910288780.7, filed on Apr. 11, 2019, the full disclosure of which is incorporated herein by reference.

BACKGROUND

Technical Field

The present disclosure relates to transmission methods and devices in wireless communication systems, and in particular to a communication method and device that support data transmission on Unlicensed Spectrum.

Related Art

Unlicensed Spectrum communications is introduced into cellular systems by the 3rd Generation Partner Project (3GPP) Long-term Evolution (LTE) Release 13 and Release 14. To ensure compatibility with other access technologies on Unlicensed Spectrum, the technique of Listen Before Talk (LBT) is adopted by Licensed Assisted Access (LAA) of LTE to avoid interferences caused by multiple transmitters occupying the same frequency resources simultaneously. LBT in an LTE system is wideband, which means that the LBT's bandwidth is the same as that of a Component Carrier (CC). In a system at Phase 1 of 5G New Radio (NR) Access Technology, the concept of Bandwidth Part (BWP) is introduced in a CC to provide better support to various pieces of User Equipment (UEs) with different reception bandwidth and transmission bandwidth capabilities. When a UE with larger bandwidth is in communication with a cell, the UE is allowed to perform downlink reception or uplink transmission on a BWP with larger bandwidth. As discussions about access technologies on Unlicensed Spectrum are still in progress in NR Release 16, the adoption of Subband LBT has been approved. Bandwidth of the Subband LBT is an integral multiple of 20 MHz, which is equal to or smaller than that of the BWP.

Reference Signal remains an essential means of ensuring communication quality in a wireless communication system. In a high-frequency band, the phase noise will cause a non-negligible impact on the performance of channel estimation. In NR R15, a Phase-Tracking Reference Signal (PTRS) is used by a receiving end for phase-tracking, employing phase compensation in channel estimation to improve the precision of channel estimation.

SUMMARY

Inventors find through researches that compared with wideband LBT in the LTE system, the chance of channel access will get higher when employing Subband LBT in an NR system, but there will be uncertainty of resources actually occupied, in such a case, how to design PTRS becomes a key issue to be considered.

To address the above problem, the present disclosure provides a solution. It should be noted that the embodiments of the present disclosure and the characteristics in the embodiments may be mutually combined if no conflict is incurred.

The present disclosure provides a method in a UE for wireless communications, comprising:

receiving a first signaling, the first signaling indicating N1 time-frequency resource blocks; and operating N radio signals respectively in N time-frequency resource blocks;

herein, the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the operating action is transmitting, or, the operating action is receiving.

In one embodiment, a problem to be solved in the present disclosure is that the PTRS design under a Subband LBT is a key issue that needs to be studied.

In one embodiment, a problem to be solved in the present disclosure is that: in the present NR Standard, a scheduled bandwidth of a PDSCH/PUSCH is used to determine frequency density of a PTRS, the smaller the scheduled bandwidth is, the lower frequency density of the PTRS will likely be (that is, more densely distributed frequency-domains), and, in the case of wideband LBT, a bandwidth actually occupied is as large as a scheduled bandwidth; however, in the case of Subband LBT, when a PDSCH/PUSCH's scheduled time-frequency resources comprise time-frequency resources on more than one subband, due to uncertainty of channel occupancy, an actually occupied bandwidth is probably smaller than a scheduled bandwidth, then it is undoubtedly necessary to rethink how to determine the frequency density of PTRS under Subband LBT.

In one embodiment, the essence of the above method lies in that N1 time-frequency resource blocks are time-frequency resources scheduled to a PDSCH/PUSCH, and N1 frequency sub-bands are N1 sub-bands, of which only N sub-bands are idle, therefore, the PDSCH/PUSCH is transmitted only in N time-frequency resource blocks of the N1 time-frequency resource blocks, N first-type reference signals respectively being PTRSs in the N time-frequency resource blocks; frequency density of a PTRS in a time-frequency resource block is related to only one of the N1 time-frequency resource blocks. The above method is advantageous in that the proposed method of determining frequency density of PTRS is irrelevant to either the actually occupied bandwidth or the Subband LBT, so that a transceiver interprets the PTRS' frequency density in the same way no matter how varied Subband LBT results are, thereby guaranteeing the PDSCH/PUSCH's transmission reliability.

According to one aspect of the present disclosure, the above method is characterized in that the N radio signals respectively comprise N Demodulation Reference Signals (DMRSs), antenna ports for transmitting the N first-type reference signals are the same, and antenna ports for transmitting the N DMRSs are the same, the first antenna port being one antenna port for transmitting the N DMRSs.

According to one aspect of the present disclosure, the above method is characterized in comprising:

receiving first information;

herein, the first information is used to determine M frequency sub-bands, any frequency sub-band of the N1 frequency sub-bands being one of the M frequency sub-bands; M is a positive integer no less than the N1.

According to one aspect of the present disclosure, the above method is characterized in that the target time-frequency resource block is one of the N time-frequency resource blocks that comprises time-frequency resources occupied by the first target signal, or, the target time-frequency resource block is one of the N1 time-frequency resource blocks that is of a minimum bandwidth.

In one embodiment, the essence of the above method lies in that frequency density of a PTRS in a time-frequency resource block is only related to a time-frequency resource block to which the PTRS belongs. The above method is advantageous in ensuring the accuracy of phase-tracking of PTRSs under various sub-band LBT results and transmission reliability of a PDSCH/PUSCH.

In one embodiment, the essence of the above method lies in that frequency density of a PTRS in a time-frequency resource block is only related to one of N1 time-frequency resource blocks of a minimum bandwidth, therefore, PTRSs in N time-frequency resource blocks are of equal frequency density.

According to one aspect of the present disclosure, the above method is characterized in comprising:

receiving second information;

herein, the second information indicates Q1 threshold(s), the Q1 threshold(s) being used to determine Q value sets; the Q value sets respectively correspond to Q frequency densities, Q1 being a positive integer, and Q being a positive integer greater than 1; a bandwidth of the target time-frequency resource block is used to determine the frequency density of the first target signal out of the Q frequency densities, and the bandwidth of the target time-frequency resource block belongs to only one value set of the Q value sets.

According to one aspect of the present disclosure, the above method is characterized in that any of the N1 time-frequency resource blocks comprises a positive integer number of time-frequency resource unit(s), and any two time-frequency resource units of the N1 time-frequency resource blocks are orthogonal in frequency domain; a first time-frequency resource block is one of the N time-frequency resource blocks that comprises time-frequency resources occupied by the first target signal, and the first time-frequency resource block comprises M1 time-frequency resource unit(s), and the time-frequency resources occupied by the first target signal belong to only M2 time-frequency resource unit(s) of the M1 time-frequency resource unit(s); a number of the time-frequency resource unit(s) comprised by the target time-frequency resource block and the frequency density of the first target signal are used to determine the M2 time-frequency resource unit(s) out of the M1 time-frequency resource unit(s); M1 is a positive integer, and M2 is a positive integer no greater than the M1.

In one embodiment, the essence of the above method lies in that frequency-domain distributions of PTRSs in N time-frequency resource blocks are independently determined.

According to one aspect of the present disclosure, the above method is characterized in that any of the N1 time-frequency resource blocks comprises a positive integer number of time-frequency resource unit(s), and any two time-frequency resource units of the N1 time-frequency resource blocks are orthogonal in frequency domain; the N is greater than 1, a second time-frequency resource block and a third time-frequency resource block are any two time-frequency resource blocks of the N time-frequency resource blocks that are adjacent in frequency domain, the third time-frequency resource block being of a higher frequency than the second time-frequency resource block, and a second target signal and a third target signal are two first-type reference signals of the N first-type reference signals that are respectively transmitted in the second time-frequency resource block and the third time-frequency resource block; the second time-frequency resource block comprises S1 time-frequency resource units, while the time-frequency resources occupied by the second target signal belong to only S2 time-frequency resource units of the S1 time-frequency resource units; the third time-frequency resource block comprises T1 time-frequency resource unit(s), while the time-frequency resource block occupied by the third target signal belongs to only T2 time-frequency resource unit(s) of the T1 time-frequency resource unit(s); one of the S2 time-frequency resource units of a highest frequency and frequency density of the third target signal are used to determine the T2 time-frequency resource unit(s) out of the T1 time-frequency resource unit(s).

In one embodiment, the essence of the above method lies in that frequency-domain distributions of PTRSs comprised in N time-frequency resource blocks are not independently determined, which means that frequency-domain distribution of a PTRS in a time-frequency resource block is likely to be associated with that of a PTRS in another time-frequency resource block.

According to one aspect of the present disclosure, the above method is characterized in comprising:

performing a target access detection on a first frequency band, or, performing N1 first-type access detections respectively on the N1 frequency sub-bands;

herein, the operating action is transmitting; the first frequency band comprises the N1 frequency sub-bands, the target access detection is used to determine that the N radio signals are respectively transmitted in the N time-frequency resource blocks, and the N1 first-type access detections are used to determine that the N radio signals are respectively transmitted in the N time-frequency resource blocks.

In one embodiment, the essence of the above method lies in that a target access detection is wideband LBT, and N1 first-type access detections are respectively sub-band LBTs for N1 frequency sub-bands.

The present disclosure provides a method in a base station for wireless communications, comprising:

transmitting a first signaling, the first signaling indicating N1 time-frequency resource blocks; and processing N radio signals respectively in N time-frequency resource blocks;

herein, the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the processing action is receiving, or, the processing action is transmitting.

According to one aspect of the present disclosure, the above method is characterized in that the N radio signals respectively comprise N Demodulation Reference Signals (DMRSs), antenna ports for transmitting the N first-type reference signals are the same, and antenna ports for transmitting the N DMRSs are the same, the first antenna port being one antenna port for transmitting the N DMRSs.

According to one aspect of the present disclosure, the above method is characterized in comprising:

transmitting first information;

herein, the first information is used to determine M frequency sub-bands, any frequency sub-band of the N1 frequency sub-bands being one of the M frequency sub-bands; M is a positive integer no less than the N1.

According to one aspect of the present disclosure, the above method is characterized in that the target time-frequency resource block is one of the N time-frequency resource blocks that comprises time-frequency resources occupied by the first target signal, or, the target time-frequency resource block is one of the N1 time-frequency resource blocks that is of a minimum bandwidth.

According to one aspect of the present disclosure, the above method is characterized in comprising:

transmitting second information;

herein, the second information indicates Q1 threshold(s), the Q1 threshold(s) being used to determine Q value sets; the Q value sets respectively correspond to Q frequency densities, Q1 being a positive integer, and Q being a positive integer greater than 1; a bandwidth of the target time-frequency resource block is used to determine the frequency density of the first target signal out of the Q frequency densities, and the bandwidth of the target time-frequency resource block belongs to only one value set of the Q value sets.

According to one aspect of the present disclosure, the above method is characterized in that any of the N1 time-frequency resource blocks comprises a positive integer number of time-frequency resource unit(s), and any two time-frequency resource units of the N1 time-frequency resource blocks are orthogonal in frequency domain; a first time-frequency resource block is one of the N time-frequency resource blocks that comprises time-frequency resources occupied by the first target signal, and the first time-frequency resource block comprises M1 time-frequency resource unit(s), and the time-frequency resources occupied by the first target signal belong to only M2 time-frequency resource unit(s) of the M1 time-frequency resource unit(s); a number of the time-frequency resource unit(s) comprised by the target time-frequency resource block and the frequency density of the first target signal are used to determine the M2 time-frequency resource unit(s) out of the M1 time-frequency resource unit(s); M1 is a positive integer, and M2 is a positive integer no greater than the M1.

According to one aspect of the present disclosure, the above method is characterized in that any of the N1 time-frequency resource blocks comprises a positive integer number of time-frequency resource unit(s), and any two time-frequency resource units of the N1 time-frequency resource blocks are orthogonal in frequency domain; the N is greater than 1, a second time-frequency resource block and a third time-frequency resource block are any two time-frequency resource blocks of the N time-frequency resource blocks that are adjacent in frequency domain, the third time-frequency resource block being of a higher frequency than the second time-frequency resource block, and a second target signal and a third target signal are two first-type reference signals of the N first-type reference signals that are respectively transmitted in the second time-frequency resource block and the third time-frequency resource block; the second time-frequency resource block comprises S1 time-frequency resource units, while the time-frequency resources occupied by the second target signal belong to only S2 time-frequency resource units of the S1 time-frequency resource units; the third time-frequency resource block comprises T1 time-frequency resource unit(s), while the time-frequency resource block occupied by the third target signal belongs to only T2 time-frequency resource unit(s) of the T1 time-frequency resource unit(s); one of the S2 time-frequency resource units of a highest frequency and frequency density of the third target signal are used to determine the T2 time-frequency resource unit(s) out of the T1 time-frequency resource unit(s).

According to one aspect of the present disclosure, the above method is characterized in comprising:

performing N1 second-type access detections respectively on the N1 frequency sub-bands;

herein, the processing action is transmitting, and the N1 second-type access detections are used to determine that the N radio signals are respectively transmitted in the N time-frequency resource blocks.

The present disclosure provides a UE for wireless communications, comprising:

a first receiver, which receives a first signaling, the first signaling indicating N1 time-frequency resource blocks; and a first transceiver, which operates N radio signals respectively in N time-frequency resource blocks;

herein, the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the operating action is transmitting, or, the operating action is receiving.

The present disclosure provides a base station for wireless communications, comprising:

a second transmitter, which transmits a first signaling, the first signaling indicating N1 time-frequency resource blocks; and a second transceiver, which processes N radio signals respectively in N time-frequency resource blocks;

herein, the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the processing action is receiving, or, the processing action is transmitting.

In one embodiment, the present disclosure is advantageous over prior art in the following aspects:

According to the present NR Standard, a PDSCH/PUSCH's scheduled bandwidth is used to determine frequency density of a PTRS. The smaller the scheduled bandwidth is, the lower the PTRS' frequency density will likely be, that is, more concentrated frequency-domain distribution. When wideband LBT is employed, the bandwidth actually occupied is equal to the scheduled bandwidth; but when employing Subband LBT, under which scheduled time-frequency resources of a PDSCH/PUSCH comprise time-frequency resources on multiple sub-bands, since channel occupancy is unclear, the actually occupied bandwidth is potentially smaller than the scheduled bandwidth, in this regard, the method of determination on PTRS frequency density put forward will be applicable to the occasion of Subband LBT.

The method of determining PTRS frequency density provided in the present disclosure is unrelated to actually occupied bandwidth or the result of Subband LBT, so that a transceiver's understanding of the PTRS frequency density stays the same under various Subband LBT results, thus ensuring transmission reliability of a PDSCH/PUSCH.

In the method proposed above, the frequency density of a PTRS in a time-frequency resource block is only related to time-frequency resource block that the PTRS belongs to; or, the frequency density of a PTRS in a time-frequency resource block is only related to one of N1 time-frequency resource blocks that is of a smallest bandwidth, when PTRSs comprised in N time-frequency resource blocks are of equal frequency density, thereby guaranteeing the accuracy of Phase-tracking of PTRS and PDSCH/PUSCH transmission reliability.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
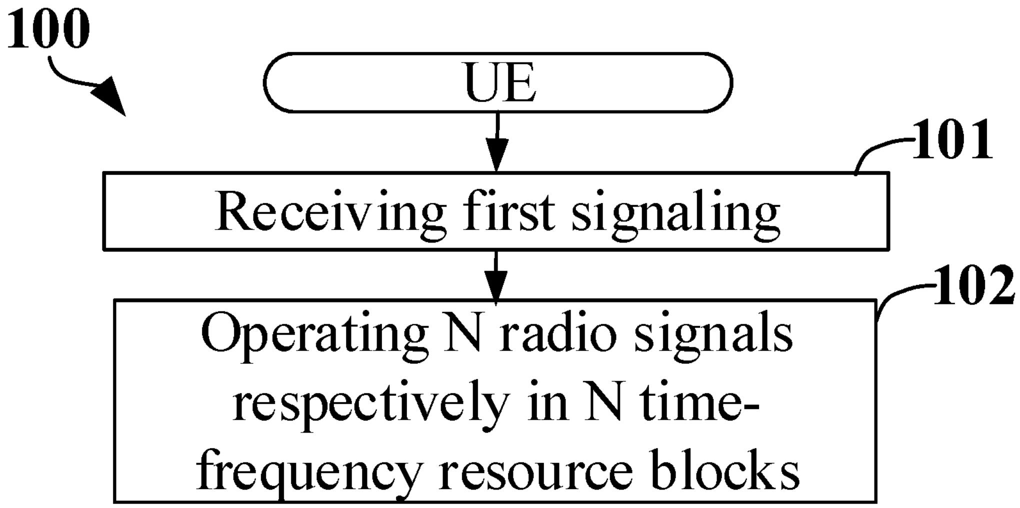
FIG. 1 illustrates a flowchart of a first signaling and N radio signals according to one embodiment of the present disclosure.

Embodiment 1 illustrates a flowchart of a first signaling and N radio signals, as shown in FIG. 1. In Step 100 in FIG. 1, each box represents a step. Particularly, the sequence order of steps marked by these boxes do not necessarily represent a chronological order of characteristics of each step.

In Embodiment 1, the UE in the present disclosure receives a first signaling in step 101, the first signaling indicating N1 time-frequency resource blocks; and operates N radio signals respectively in N time-frequency resource blocks; herein, the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the operating action is transmitting, or, the operating action is receiving.

In one embodiment, the first signaling is dynamically configured.

In one embodiment, the first signaling is a physical-layer signaling.

In one embodiment, the first signaling is a Downlink Control Information (DCI) signaling.

In one embodiment, the first signaling is an UpLink Grant DCI signaling, the operating action being transmitting.

In one embodiment, the first signaling is a DownLink Grant DCI signaling, the operating action being receiving.

In one embodiment, the first signaling is transmitted on a downlink physical layer control channel (i.e., a downlink channel only capable of carrying a physical-layer signaling).

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a Narrowband PDCCH (NPDCCH).

In one embodiment, the operating action is receiving, and the first signaling is DCI format 1_0.

In one embodiment, the operating action is receiving, and the first signaling is DCI format 1_1.

In one embodiment, the operating action is transmitting, and the first signaling is DCI format 0_0.

In one embodiment, the operating action is transmitting, and the first signaling is DCI format 0_1.

In one embodiment, the N1 frequency sub-bands are pre-defined.

In one embodiment, the N1 frequency sub-bands are configurable.

In one embodiment, any of the N1 frequency sub-bands comprises consecutive frequency-domain resources.

In one embodiment, any of the N1 frequency sub-bands comprises a positive integer number of consecutive subcarriers.

In one embodiment, any of the N1 frequency sub-bands is of a bandwidth of a positive integral multiple of 20 MHz.

In one embodiment, any two frequency sub-bands of the N1 frequency sub-bands are of equal bandwidth.

In one embodiment, any of the N1 frequency sub-bands is of a bandwidth of 20 MHz.

In one embodiment, any of the N1 frequency sub-bands is of a bandwidth of 1 GHz.

In one embodiment, any of the N1 frequency sub-bands is of a bandwidth of a positive integral multiple of 1 GHz.

In one embodiment, the N1 frequency sub-bands belong to a same carrier.

In one embodiment, the N1 frequency sub-bands belong to a same Bandwidth Part (BWP).

In one embodiment, the N1 frequency sub-bands are N1 sub-bands respectively.

In one embodiment, the N1 frequency sub-bands are deployed at Unlicensed Spectrum.

In one embodiment, frequency-domain resources respectively comprised by any two frequency sub-bands of the N1 frequency sub-bands are orthogonal (that is, non-overlapping).

In one embodiment, any subcarrier in any given frequency sub-band of the N1 frequency sub-bands does not belong to any of the N1 frequency sub-bands other than the given frequency sub-band.

In one embodiment, a first given frequency sub-band and a second given frequency sub-band are any two frequency sub-bands of the N1 frequency sub-bands, there isn't any subcarrier in the first given frequency sub-band that has a frequency higher than a subcarrier of a lowest frequency in the second given frequency sub-band and lower than a subcarrier of a highest frequency in the second given frequency sub-band.

In one embodiment, any of the N1 time-frequency resource blocks comprises a positive integer number of Resource Element(s) (RE).

In one embodiment, any of the N1 time-frequency resource blocks comprises a positive integer number of Resource Block(s) (RB) in frequency domain.

In one embodiment, any of the N1 time-frequency resource blocks comprises a positive integer number of RBs evenly distributed in frequency domain.

In one embodiment, any of the N1 time-frequency resource blocks comprises a positive integer number of subcarrier(s) in frequency domain.

In one embodiment, any of the N1 time-frequency resource blocks comprises a positive integer number of subcarriers evenly distributed in frequency domain.

In one embodiment, any of the N1 time-frequency resource blocks comprises a positive integer number of Resource Block Group(s) (RBG) in frequency domain.

In one embodiment, any of the N1 time-frequency resource blocks comprises a positive integer number of multicarrier symbol(s) in time domain.

In one embodiment, any of the N1 time-frequency resource blocks comprises a positive integer number of consecutive multicarrier symbols in time domain.

In one embodiment, any two time-frequency resource blocks of the N1 time-frequency resource blocks comprise (a) same multicarrier symbol(s) in time domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises Cyclic Prefix (CP).

In one embodiment, the N radio signals also comprise N sub-signals respectively, the N sub-signals carrying a first bit block.

In one subembodiment, the N1 time-frequency resource blocks are reserved for the first bit block, and only the N time-frequency resource blocks of the N1 time-frequency resource blocks are used to transmit the first bit block.

In one subembodiment, the first bit block comprises a positive integer number of bit(s).

In one subembodiment, the first bit block comprises a Transport Block (TB).

In one subembodiment, the N sub-signals are transmitted on a downlink physical layer data channel (i.e., a downlink channel capable of carrying physical layer data).

In one subembodiment, the N sub-signals each comprise data.

In one subembodiment, the first bit block is used to generate the N sub-signals.

In one subembodiment, the N sub-signals comprise a transmission of the first bit block.

In one subembodiment, the N sub-signals respectively comprise N transmissions of the first bit block.

In one subembodiment, the N sub-signals are obtained by the first bit block sequentially through CRC Insertion, Channel Coding, Rate Matching, Scrambling, Modulation, and Layer Mapping, Precoding, Mapping to Resource Element, OFDM Baseband Signal Generation, and Modulation and Upconversion.

In one subembodiment, the N sub-signals are obtained by the first bit block sequentially through CRC Insertion, Channel Coding, Rate Matching, Scrambling, Modulation, and Layer Mapping, Precoding, Mapping to Virtual Resource Blocks, Mapping from Virtual to Physical Resource Blocks, OFDM Baseband Signal Generation, and Modulation and Upconversion.

In one subembodiment, the N sub-signals are obtained by the first bit block sequentially through CRC Insertion, Segmentation, CB-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one subembodiment, a given sub-signal is any of the N sub-signals, and the given sub-signal is obtained by a first bit block sequentially through CRC Insertion, Channel Coding, Rate Matching, Scrambling, and Modulation, Layer Mapping, Precoding, Mapping to Resource Element, OFDM Baseband Signal Generation, and Modulation and Upconversion.

In one subembodiment, a given sub-signal is any of the N sub-signals, and the given sub-signal is obtained by a first bit block sequentially through CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one subembodiment, a given sub-signal is any of the N sub-signals, and the given sub-signal is obtained by a first bit block sequentially through CRC Insertion, Segmentation, CB-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NPDSCH).

In one embodiment, each of the N first-type reference signals comprises a Phase-Tracking Reference Signal (PTRS).

In one embodiment, the number of transmission antenna port(s) for each of the N first-type reference signals is equal to 1.

In one embodiment, the phrase that an antenna port for transmitting each of the N first-type reference signals is associated with a first antenna port means that the antenna port for transmitting each of the N first-type reference signals and the first antenna port are transmitted by a same antenna group and correspond to a same precoding vector; the antenna group comprises a positive integer number of antenna(s).

In one embodiment, the phrase that an antenna port for transmitting each of the N first-type reference signals is associated with a first antenna port means that small-scale channel fading parameters that the antenna port for transmitting each of the N first-type reference signals goes through can be used to infer small-scale channel fading parameters that the first antenna port goes through.

In one embodiment, the phrase that an antenna port for transmitting each of the N first-type reference signals is associated with a first antenna port means that small-scale channel fading parameters that the first antenna port goes through can be used to infer small-scale channel fading parameters that the antenna port for transmitting each of the N first-type reference signals goes through.

In one embodiment, the phrase that an antenna port for transmitting each of the N first-type reference signals is associated with a first antenna port means that the antenna port for transmitting each of the N first-type reference signals can be used to compensate phase noise of N Demodulation Reference Signals (DMRSs); the N radio signals respectively comprise the N DMRSs, and antenna ports for transmitting the N DMRSs are the same, the first antenna port being one antenna port for transmitting the N DMRSs.

In one embodiment, the phrase that an antenna port for transmitting each of the N first-type reference signals is associated with a first antenna port means that the antenna port for transmitting each of the N first-type reference signals can be used to compensate phase noise of the N radio signals.

In one embodiment, the phrase that an antenna port for transmitting each of the N first-type reference signals is associated with a first antenna port means that each subcarrier occupied by the antenna port for transmitting each of the N first-type reference signals belongs to a subcarrier group occupied by N DMRSs, the subcarrier group comprising a positive integer number of subcarrier(s); the N radio signals respectively comprise the N DMRSs, and antenna ports for transmitting the N DMRSs are the same, the first antenna port being one antenna port for transmitting the N DMRSs.

In one embodiment, the phrase that an antenna port for transmitting each of the N first-type reference signals is associated with a first antenna port means that the antenna port for transmitting each of the N first-type reference signals and the first antenna port are assumed to be Quasi Co-Located (QCL).

In one embodiment, the phrase that an antenna port for transmitting each of the N first-type reference signals is associated with a first antenna port means that the antenna port for transmitting each of the N first-type reference signals and the first antenna port are assumed to be spatial QCL.

In one embodiment, the phrase that an antenna port for transmitting each of the N first-type reference signals is associated with a first antenna port means that the antenna port for transmitting each of the N first-type reference signals and the first antenna port are assumed to be with respect to QCL-TypeA and QCL-TypeD being QCL.

In one subembodiment of the above embodiment, the QCL-TypeA comprises Doppler shift, Doppler spread and Delay spread.

In one subembodiment of the above embodiment, the QCL-TypeD comprises Spatial Rx parameters.

In one embodiment, two antenna ports being QCL means that all or part of large-scale properties of a radio signal transmitted from one of the two antenna ports can be used to infer all or part of large-scale properties of a radio signal transmitted from the other of the two antenna ports.

In one embodiment, two antenna ports being QCL means that the two antenna ports share at least a same QCL parameter, the QCL parameter comprising at least one of a multi-antenna related QCL parameter or a multi-antenna unrelated QCL parameter.

In one embodiment, two antenna ports being QCL means that at least one QCL parameter of one of the two antenna ports can be used to infer at least one QCL parameter of the other of the two antenna ports, the QCL parameter comprising at least one of a multi-antenna related QCL parameter or a multi-antenna unrelated QCL parameter.

In one embodiment, two antenna ports being QCL means that multi-antenna related reception of a radio signal transmitted from one of the two antenna ports can be used to infer multi-antenna related reception of a radio signal transmitted from the other of the two antenna ports.

In one embodiment, two antenna ports being QCL means that multi-antenna related transmission of a radio signal transmitted from one of the two antenna ports can be used to infer multi-antenna related transmission of a radio signal transmitted from the other of the two antenna ports.

In one embodiment, two antenna ports being QCL means that multi-antenna related reception of a radio signal transmitted from one of the two antenna ports can be used to infer multi-antenna related transmission of a radio signal transmitted from the other of the two antenna ports; a receiver of the radio signal transmitted from one of the two antenna ports is the same as a transmitter of the radio signal transmitted from the other of the two antenna ports.

In one embodiment, two antenna ports being spatial QCL means that all or part of multi-antenna related large-scale properties of a radio signal transmitted from one of the two antenna ports can be used to infer all or part of multi-antenna related large-scale properties of a radio signal transmitted from the other of the two antenna ports.

In one embodiment, two antenna ports being spatial QCL means that the two antenna ports share at least a same multi-antenna related QCL parameter (spatial QCL parameter).

In one embodiment, two antenna ports being spatial QCL means that at least one multi-antenna related QCL parameter of one of the two antenna ports can be used to infer at least one multi-antenna related QCL parameter of the other of the two antenna ports.

In one embodiment, two antenna ports being spatial QCL means that multi-antenna related reception of a radio signal transmitted from one of the two antenna ports can be used to infer multi-antenna related reception of a radio signal transmitted from the other of the two antenna ports.

In one embodiment, two antenna ports being spatial QCL means that multi-antenna related transmission of a radio signal transmitted from one of the two antenna ports can be used to infer multi-antenna related transmission of a radio signal transmitted from the other of the two antenna ports.

In one embodiment, two antenna ports being spatial QCL means that multi-antenna related reception of a radio signal transmitted from one of the two antenna ports can be used to infer multi-antenna related transmission of a radio signal transmitted from the other of the two antenna ports; a receiver of the radio signal transmitted from one of the two antenna ports is the same as a transmitter of the radio signal transmitted from the other of the two antenna ports.

In one embodiment, the multi-antenna related QCL parameter comprises one or more of angle of arrival, angle of departure, spatial correlation, multi-antenna related transmission or multi-antenna related reception.

In one embodiment, the multi-antenna unrelated QCL parameter comprises one or more of Average delay, delay spread, Doppler spread, Doppler shift, path loss or average gain.

In one embodiment, the multi-antenna related reception refers to Spatial Rx parameters.

In one embodiment, the multi-antenna related reception refers to a receiving beam.

In one embodiment, the multi-antenna related reception refers to a reception beamforming matrix.

In one embodiment, the multi-antenna related reception refers to a reception analog beamforming matrix.

In one embodiment, the multi-antenna related reception refers to a reception analog beamforming vector.

In one embodiment, the multi-antenna related reception refers to a reception beamforming vector.

In one embodiment, the multi-antenna related reception refers to a Rx spatial filtering.

In one embodiment, the multi-antenna related transmission refers to Spatial Tx parameters.

In one embodiment, the multi-antenna related transmission refers to a transmitting beam.

In one embodiment, the multi-antenna related transmission refers to a transmission beamforming matrix.

In one embodiment, the multi-antenna related transmission refers to a transmission analog beamforming matrix.

In one embodiment, the multi-antenna related transmission refers to a transmission analog beamforming vector.

In one embodiment, the multi-antenna related transmission refers to a transmission beamforming vector.

In one embodiment, the multi-antenna related transmission refers to a Tx spatial filtering.

In one embodiment, the Spatial Tx parameters comprise one or more of a transmission antenna port, a transmission antenna port group, a transmitting beam, a transmission analog beamforming matrix, a transmission analog beamforming vector, a transmission beamforming matrix, a transmission beamforming vector or a Tx spatial filtering.

In one embodiment, the Spatial Rx parameters comprise one or more of a receiving beam, a reception analog beamforming matrix, a reception analog beamforming vector, a reception beamforming matrix, a reception beamforming vector or a Rx spatial filtering.

In one embodiment, the operating action is transmitting.

In one embodiment, the operating action is receiving.

In one embodiment, of the N1 time-frequency resource blocks only the target time-frequency resource block's bandwidth is used to determine the frequency density of the first target signal.

In one embodiment, the frequency density of the first target signal is a positive integer.

In one embodiment, the frequency density of the first target signal is equal to 2 or 4.

In one embodiment, a given time-frequency resource block comprises a positive integer number of time-frequency resource units, and any two time-frequency resource units in the given time-frequency resource block are orthogonal in frequency domain; a bandwidth of the given time-frequency resource block is a number of the time-frequency resource units comprised in the given time-frequency resource block.

In one subembodiment, the time-frequency resource unit comprises an RB in frequency domain.

In one subembodiment, the time-frequency resource unit comprises a positive integer number of consecutive subcarriers in frequency domain.

In one subembodiment, any two time-frequency resource units comprised by the given time-frequency resource block occupy a same time-domain resource.

In one subembodiment, time-frequency resources respectively occupied by any two time-frequency resource units comprised by the given time-frequency resource block are of equal size.

In one embodiment, a bandwidth of a given time-frequency resource block refers to a number of RBs comprised by the given time-frequency resource block in frequency domain.

In one embodiment, a bandwidth of a given time-frequency resource block refers to a number of subcarriers comprised by the given time-frequency resource block in frequency domain.

In one embodiment, a bandwidth of a given time-frequency resource block refers to frequency occupied by the given time-frequency resource block, the bandwidth of the given time-frequency resource block being measured by Hz.

Embodiment 2

Figure 2:
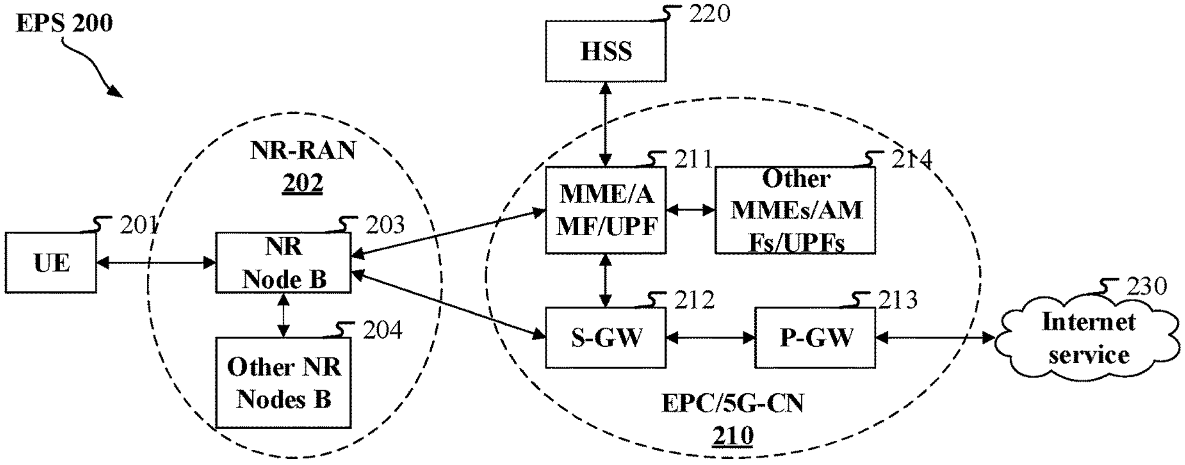
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the UE in the present disclosure.

In one embodiment, the gNB203 corresponds to the base station in the present disclosure.

In one subembodiment, the UE 201 supports MIMO-based wireless communications.

In one subembodiment, the gNB203 supports MIMO-based wireless communications.

In one subembodiment, the UE 201 supports wireless communications with data transmitted on Unlicensed Spectrum.

In one subembodiment, the UE 201 supports wireless communications with data transmitted on Licensed Spectrum.

In one embodiment, the gNB203 supports wireless communications with data transmitted on Unlicensed Spectrum.

In one embodiment, the gNB203 supports wireless communications with data transmitted on Licensed Spectrum.

Embodiment 3

Figure 3:
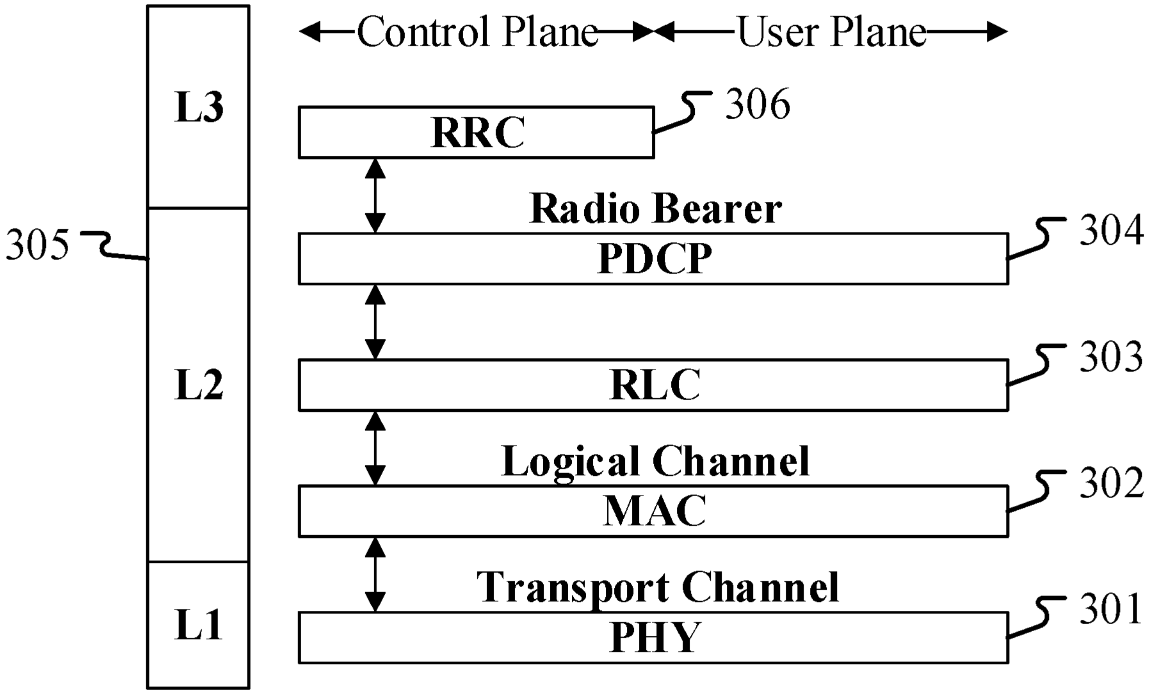
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the PHY 301.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the MAC sublayer 302.

In one embodiment, the first signaling in the present disclosure is generated by the PHY 301.

In one embodiment, the N radio signals in the present disclosure are generated by the PHY 301.

In one embodiment, the target access detection in the present disclosure is generated by the PHY 301.

In one embodiment, the N1 first-type access detections in the present disclosure are generated by the PHY 301.

In one embodiment, the N1 second-type access detections in the present disclosure are generated by the PHY 301.

Embodiment 4

Figure 4:
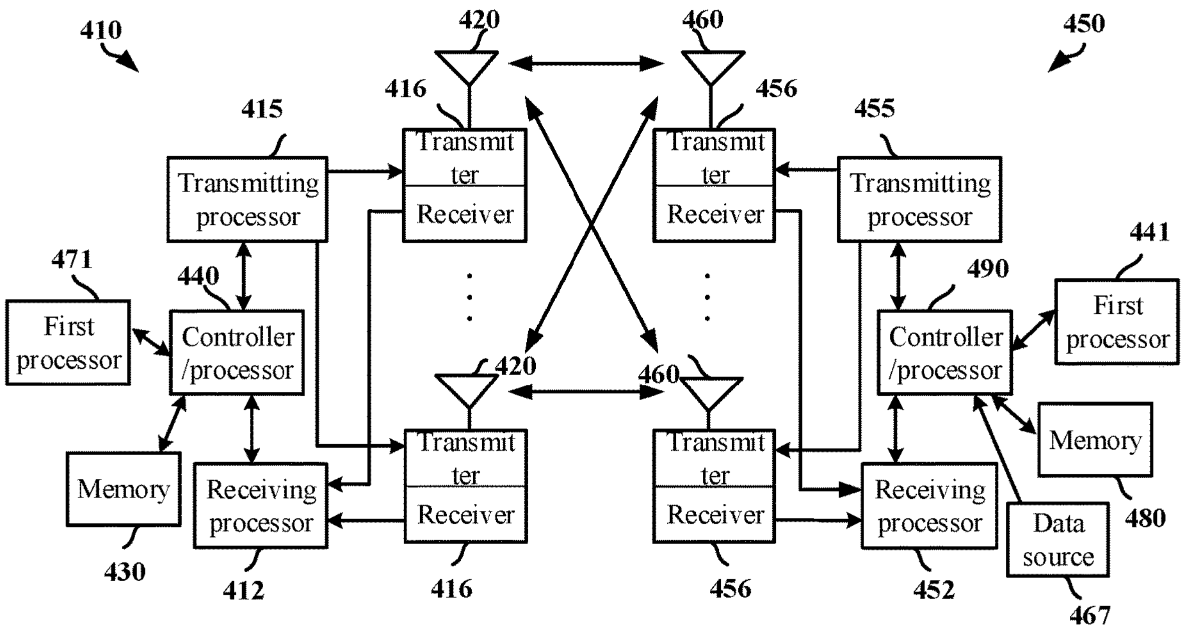
FIG. 4 illustrates a schematic diagram of a New Radio (NR) node and a UE according to one embodiment of the present disclosure.

Embodiment 4 illustrates a schematic diagram of a base station and a UE according to the present disclosure, as shown in FIG. 4. FIG. 4 is a block diagram of a gNB 410 in communication with a UE 450 in an access network.

A base station (410) comprises a controller/processor 440, a memory 430, a receiving processor 412, a first processor 471, a transmitting processor 415, a transmitter/receiver 416 and an antenna 420.

A UE (450) comprises a controller/processor 490, a memory 480, a data source 467, a first processor 441, a transmitting processor 455, a receiving processor 452, a transmitter/receiver 456 and antenna 460.

In downlink (DL) transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The first processor 471 determines to transmit the first signaling.

The first processor 471 determines to transmit N radio signals respectively in N time-frequency resource blocks.

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling (such as PBCH, PDCCH, PHICH, PCFICH and a reference signal).

The transmitting processor 415 receives bit flows output from the controller/processor 440 and provides various signal transmitting processing functions used for the L1 layer (that is PHY), including multi-antenna transmission, spreading, Code Division Multiplexing and precoding.

The transmitter 416 is configured to convert a baseband signal provided from the transmitting processor 415 into a radio frequency signal which is to be transmitted via the antenna 420; each transmitter 416 performs sampling processing on respectively input symbol stream to acquire respective sampled signal stream. And each transmitter 416 further processes respectively sampled stream, for instance, by digital-to-analogue conversion, amplification, filtering and upconversion, to obtain a downlink signal.

In DL transmission, processes relevant to the UE 450 may comprise the following:

The receiver 456 is used to convert a radio frequency signal received via the antenna 460 into a baseband signal to be provided to the receiving processor 452.

The receiving processor 452 provides various signal receiving processing functions used for the L1 layer (that is PHY), including decoding, de-interleaving, descrambling, demodulating and extraction of physical layer control signaling.

The receiving processor 452 provides various signal receiving processing functions used for the L1 layer (that is PHY), including multi-antenna reception, despreading, Code Division Multiplexing and precoding.

The first processor 441 determines to receive the first signaling.

The beam processor 441 determines to receive N radio signals respectively in N time-frequency resource blocks.

The controller/processor 490 receives bit flows output from the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 may be called a computer readable medium.

In uplink (UL) transmission, processes relevant to the base station 410 comprise the following:

The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including decoding, de-interleaving, descrambling, demodulation and extraction of physical layer control signaling.

The receiving processor 412 provides various signal receiving processing functions used for the L1 layer (that is PHY), including multi-antenna reception, despreading, Code Division Multiplexing and precoding.

The controller/processor 440 implements the functions of the L2 layer, and is associated with the memory 430 that stores program code and data.

The controller/processor 440 provides demultiplexing between a transport channel and a logical channel, packet reassembling, decryption, header decompression and control signal processing so as to recover a higher-layer packet from the UE450; the higher-layer packet may be provided to a core network.

The beam processor 471 determines to receive N radio signals respectively in N time-frequency resource blocks.

In UL, processes relevant to the UE 450 comprise the following:

The data source 467 provides a higher-layer packet to the controller/processor 490. The data source 467 represents all protocol layers above the L2 layer.

The transmitter 456 transmits a radio frequency signal via a corresponding antenna 460, converting a baseband signal into a radio frequency signal and providing the radio frequency signal to the corresponding antenna 460.

The transmitting processor 455 provides various signal receiving processing functions used for the L1 layer (i.e., PHY), including decoding, de-interleaving, descrambling, demodulation and extraction of physical layer control signaling.

The transmitting processor 455 provides various signal receiving processing functions used for the L1 layer (i.e., PHY), including multi-antenna transmission, spreading, Code Division Multiplexing and precoding.

The controller/processor 490 performs header compression, encryption, packet segmentation and reordering as well as multiplexing between a logical channel and a transport channel based on radio resources allocation of the gNB410, thereby implementing the L2 layer functions used for the user plane and the control plane.

The controller/processor 490 is also in charge of HARQ operation, retransmission of a lost packet and a signaling to the gNB410.

The beam processor 441 determines to transmit N radio signals respectively in N time-frequency resource blocks.

In one embodiment, the UE450 comprises at least one processor and at least one memory. The at least one memory includes computer program codes. The at least one memory and the computer program codes are configured to be used in collaboration with the at least one processor. The UE 450 at least comprises the following: the first signaling indicates N1 time-frequency resource blocks; the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the operating action is transmitting, or, the operating action is receiving.

In one embodiment, the UE 450 comprises a memory that stores a computer readable instruction program. The computer readable instruction program generates actions when executed by at least one processor, which include: the first signaling indicating N1 time-frequency resource blocks; the N1 time-frequency resource blocks respectively belonging to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the operating action is transmitting, or, the operating action is receiving.

In one embodiment, the gNB 410 comprises at least one processor and at least one memory. The at least one memory includes computer program codes. The at least one memory and the computer program codes are configured to be used in collaboration with the at least one processor. The gNB 410 at least comprises the following: the first signaling indicates N1 time-frequency resource blocks; the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the processing action is receiving, or, the processing action is transmitting.

In one embodiment, the gNB 410 comprises a memory that stores a computer readable instruction program. The computer readable instruction program generates actions when executed by at least one processor, which include: the first signaling indicating N1 time-frequency resource blocks; the N1 time-frequency resource blocks respectively belonging to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the processing action is receiving, or, the processing action is transmitting.

In one embodiment, the UE 450 corresponds to the UE in the present disclosure.

In one embodiment, the gNB410 corresponds to the base station in the present disclosure.

In one embodiment, at least the first two of the receiver 456, the receiving processor 452 and the controller/processor 490 are used to receive the first information in the present disclosure.

In one embodiment, at least the first two of the transmitter 416, the transmitting processor 415 and the controller/processor 440 are used to transmit the first information in the present disclosure.

In one embodiment, at least the first two of the receiver 456, the receiving processor 452 and the controller/processor 490 are used to receive the second information in the present disclosure.

In one embodiment, at least the first two of the transmitter 416, the transmitting processor 415 and the controller/processor 440 are used to transmit the second information in the present disclosure.

In one embodiment, at least the first two of the receiver 456, the receiving processor 452 and the controller/processor 490 are used to receive the first signaling in the present disclosure.

In one embodiment, at least the first two of the transmitter 416, the transmitting processor 415 and the controller/processor 440 are used to transmit the first signaling in the present disclosure.

In one embodiment, the operating action is receiving, at least the first two of the receiver 456, the receiving processor 452 and the controller/processor 490 being used to receive the N radio signals of the present disclosure respectively in the N time-frequency resource blocks of the present disclosure.

In one embodiment, the processing action is transmitting, at least the first two of the transmitter 416, the transmitting processor 415 and the controller/processor 440 being used to transmit the N radio signals of the present disclosure respectively in the N time-frequency resource blocks of the present disclosure.

In one embodiment, the operating action is receiving, at least the first two of the receiver 456, the receiving processor 452 and the controller/processor 490 being used to perform the target access detection of the present disclosure on the first frequency band of the present disclosure.

In one embodiment, the operating action is receiving, at least the first two of the receiver 456, the receiving processor 452 and the controller/processor 490 being used to perform the N1 first-type access detections of the present disclosure respectively on the N1 frequency sub-bands of the present disclosure.

In one embodiment, the operating action is transmitting, at least the first two of the transmitter 456, the transmitting processor 455 and the controller/processor 490 being used to transmit the N radio signals of the present disclosure respectively in the N time-frequency resource blocks of the present disclosure.

In one embodiment, the operating action is receiving, at least the first two of the receiver 416, the receiving processor 412 and the controller/processor 440 being used to receive the N radio signals of the present disclosure respectively in the N time-frequency resource blocks of the present disclosure.

In one embodiment, the operating action is transmitting, at least the first two of the receiver 416, the receiving processor 412 and the controller/processor 440 being used to perform the N1 second-type access detections of the present disclosure respectively on the N1 frequency sub-bands of the present disclosure.

Embodiment 5

Figure 5:
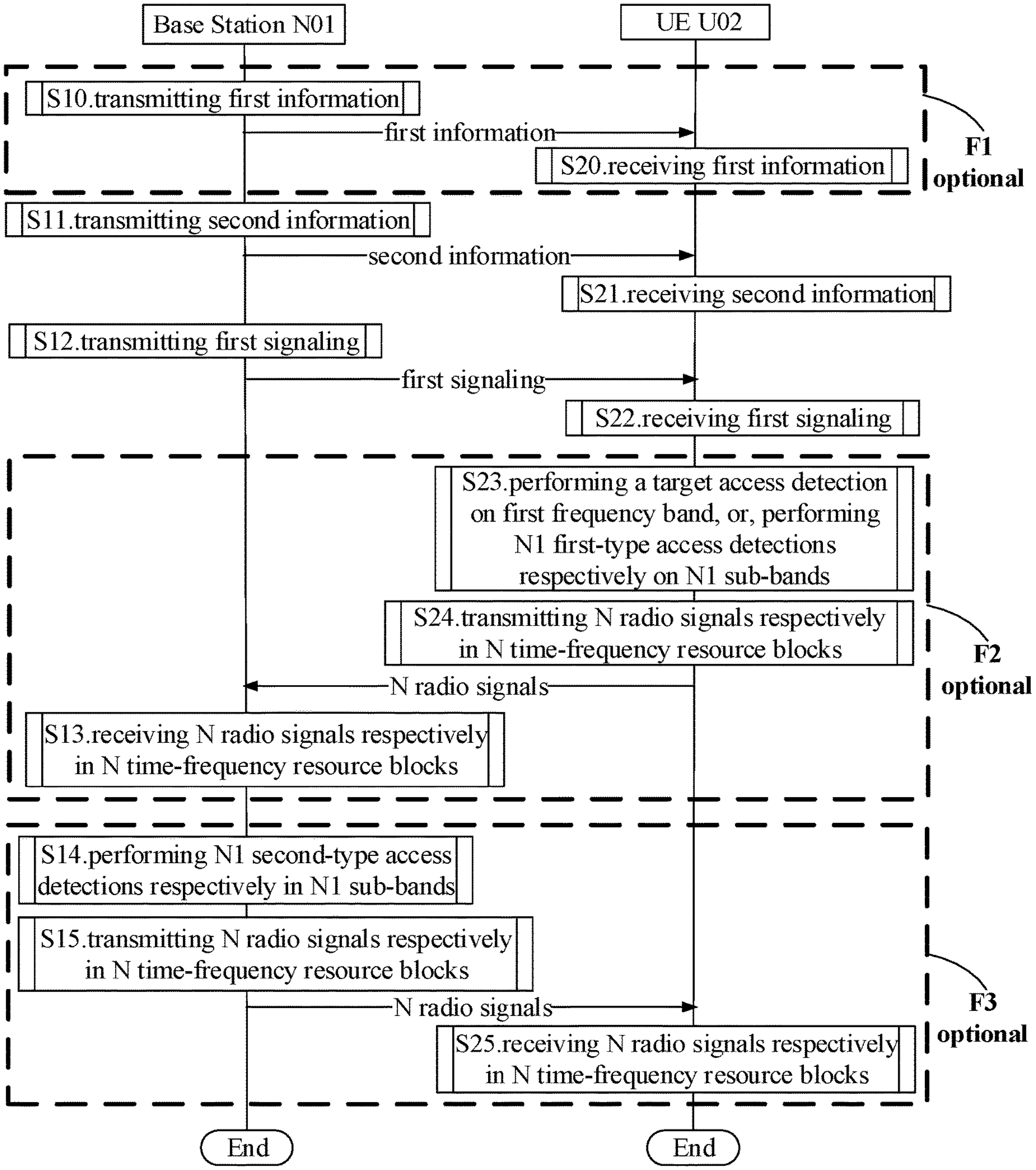
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. In FIG. 5, the box F1 is optional, and between the box F2 and the box F3 only one box exists.

The N01 transmits first information in step S10; transmits second information in step S11; and transmits a first signaling in step S12; receives N radio signals respectively in N time-frequency resource blocks in step S13; and performs N1 second-type access detections respectively on N1 frequency sub-bands in step S14; and transmits N radio signals respectively in N time-frequency resource blocks in step S15.

The U02 receives first information in step S20; receives second information in step S21; and receives a first signaling in step S22; performs a target access detection on a first frequency band in step S23, or, performs N1 first-type access detections respectively on N1 frequency sub-bands in step S23; and transmits N radio signals respectively in N time-frequency resource blocks in step S24; and receives N radio signals respectively in N time-frequency resource blocks in step S25.

In Embodiment 5, the first signaling indicates N1 time-frequency resource blocks; the U02 operates the N radio signals respectively in the N time-frequency resource blocks, while the N01 processes the N radio signals respectively in the N time-frequency resource blocks; the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks. The first information is used by the U02 to determine M frequency sub-bands, any frequency sub-band of the N1 frequency sub-bands being one of the M frequency sub-bands; M is a positive integer no less than the N1. The second information indicates Q1 threshold(s), the Q1 threshold(s) being used by the U02 to determine Q value sets; the Q value sets respectively correspond to Q frequency densities, Q1 being a positive integer, and Q being a positive integer greater than 1; a bandwidth of the target time-frequency resource block is used to determine the frequency density of the first target signal out of the Q frequency densities, and the bandwidth of the target time-frequency resource block belongs to only one value set of the Q value sets. The operating action is transmitting, and the first frequency band comprises the N1 frequency sub-bands, the target access detection is used by the U02 to determine that the N radio signals are respectively transmitted in the N time-frequency resource blocks, while the N1 first-type access detections are used by the U02 to determine that the N radio signals are respectively transmitted in the N time-frequency resource blocks; or, the processing action is transmitting, the N1 second-type access detections are used by the N01 to determine that the N radio signals are respectively transmitted in the N time-frequency resource blocks. The operating action is transmitting, while the processing action is receiving; or, the operating action is receiving, while the processing action is transmitting.

In one embodiment, the operating action is transmitting, while the processing action is receiving, and between the box F2 and the box F3 only the box F2 exists.

In one embodiment, the operating action is receiving, while the processing action is transmitting, and between the box F2 and the box F3 only the box F3 exists.

In one embodiment, the M frequency sub-bands are pre-defined.

In one embodiment, the M frequency sub-bands are configurable.

In one embodiment, any of the M frequency sub-bands comprises consecutive frequency-domain resources.

In one embodiment, any of the M frequency sub-bands comprises a positive integer number of consecutive subcarriers.

In one embodiment, any of the M frequency sub-bands is of a bandwidth of a positive integral multiple of 20 MHz.

In one embodiment, any two frequency sub-bands of the M frequency sub-bands are of equal bandwidth.

In one embodiment, any of the M frequency sub-bands is of a bandwidth of 20 MHz.

In one embodiment, any of the M frequency sub-bands is of a bandwidth of 1 GHz.

In one embodiment, any of the M frequency sub-bands is of a bandwidth of a positive integral multiple of 1 GHz.

In one embodiment, the M frequency sub-bands belong to a same carrier.

In one embodiment, the M frequency sub-bands belong to a same Bandwidth Part (BWP).

In one embodiment, the M frequency sub-bands are respectively N1 sub-bands.

In one embodiment, the M frequency sub-bands are deployed at Unlicensed Spectrum.

In one embodiment, frequency-domain resources respectively comprised by any two frequency sub-bands of the M frequency sub-bands are orthogonal (that is, non-overlapping).

In one embodiment, any subcarrier in any given frequency sub-band of the M frequency sub-bands does not belong to any of the M frequency sub-bands other than the given frequency sub-band.

In one embodiment, a third given frequency sub-band and a fourth given frequency sub-band are any two frequency sub-bands of the M frequency sub-bands, there isn't any subcarrier in the third given frequency sub-band that has a frequency higher than a subcarrier of a lowest frequency in the fourth given frequency sub-band and lower than a subcarrier of a highest frequency in the fourth given frequency sub-band.

In one embodiment, the first information indicates the M frequency sub-bands.

In one embodiment, the first information indicates the M frequency sub-bands out of M1 frequency sub-bands, any frequency sub-band of the M frequency sub-bands being one of the M1 frequency sub-bands.

In one subembodiment, the M1 frequency sub-bands are pre-defined.

In one subembodiment, the M1 frequency sub-bands are configurable.

In one subembodiment, any of the M1 frequency sub-bands comprises consecutive frequency-domain resources.

In one subembodiment, any of the M1 frequency sub-bands comprises a positive integer number of consecutive subcarriers.

In one subembodiment, any of the M1 frequency sub-bands is of a bandwidth of a positive integral multiple of 20 MHz.

In one subembodiment, any two frequency sub-bands of the M1 frequency sub-bands are of equal bandwidth.

In one subembodiment, any of the M1 frequency sub-bands is of a bandwidth of 20 MHz.

In one subembodiment, any of the M1 frequency sub-bands is of a bandwidth of 1 GHz.

In one subembodiment, any of the M1 frequency sub-bands is of a bandwidth of a positive integral multiple of 1 GHz.

In one subembodiment, the M1 frequency sub-bands belong to a same carrier.

In one subembodiment, the M1 frequency sub-bands belong to a same BWP.

In one subembodiment, the M1 frequency sub-bands are N1 sub-bands respectively.

In one subembodiment, the M1 frequency sub-bands are deployed at Unlicensed Spectrum.

In one subembodiment, frequency-domain resources respectively comprised by any two frequency sub-bands of the M1 frequency sub-bands are orthogonal (that is, non-overlapping).

In one subembodiment, any subcarrier in any given frequency sub-band of the M1 frequency sub-bands does not belong to any of the M1 frequency sub-bands other than the given frequency sub-band.

In one embodiment, a fifth given frequency sub-band and a sixth given frequency sub-band are any two frequency sub-bands of the M1 frequency sub-bands, there isn't any subcarrier in the fifth given frequency sub-band that has a frequency higher than a subcarrier of a lowest frequency in the sixth given frequency sub-band and lower than a subcarrier of a highest frequency in the sixth given frequency sub-band.

In one embodiment, the first information is semi-statically configured.

In one embodiment, the first information is carried by a higher-layer signaling.

In one embodiment, the first information is carried by a Radio Resource Control (RRC) signaling.

In one embodiment, the first information is carried by a MAC CE signaling.

In one embodiment, the first information comprises one or more Information Elements (IEs) in an RRC signaling.

In one embodiment, the first information comprises all or part of an IE in an RRC signaling.

In one embodiment, the first information comprises part of fields of an IE in an RRC signaling.

In one embodiment, the first information comprises multiple IEs in an RRC signaling.

In one embodiment, the first information is dynamically configured.

In one embodiment, the first information is carried by a physical layer signaling.

In one embodiment, the first information is carried by a DCI signaling.

In one embodiment, the second information is semi-statically configured.

In one embodiment, the second information is carried by a higher-layer signaling.

In one embodiment, the second information is carried by an RRC signaling.

In one embodiment, the second information is carried by a MAC CE signaling.

In one embodiment, the second information comprises one or more Information Elements (IEs) in an RRC signaling.

In one embodiment, the second information comprises all or part of fields of an IE in an RRC signaling.

In one embodiment, the second information comprises multiple IEs in an RRC signaling.

In one embodiment, the operating action is receiving, and the second information comprises a frequencyDensity field of a PTRS-DownlinkConfig IE in an RRC signaling, for detailed definition of the PTRS-DownlinkConfig IE and the frequencyDensity field, refer to 3GPP TS38.331, section 6.3.2.

In one embodiment, the operating action is transmitting, and the second information comprises a frequencyDensity field of a PTRS-UplinkConfig IE in an RRC signaling, for detailed definition of the PTRS-UplinkConfig IE and the frequencyDensity field, refer to 3GPP TS38.331, section 6.3.2.

In one embodiment, the target access detection is used by the U02 to determine that the N radio signals are respectively transmitted in the N time-frequency resource blocks, the N being equal to the N1.

In one embodiment, the target access detection is used by the U02 to determine that a radio signal can be transmitted in each of the N1 time-frequency resource blocks.

In one embodiment, an end time of the target access detection is no later than a start time of transmission of the N radio signals.

In one embodiment, an end time of the target access detection is earlier than a start time of transmission of the N radio signals.

In one embodiment, the target access detection is used by the U02 to determine that the first frequency band is idle.

In one embodiment, the target access detection is LBT.

In one embodiment, the target access detection is a Clear Channel Assessment (CCA).

In one embodiment, the target access detection is an uplink access detection.

In one embodiment, the N1 first-type access detections are respectively used by the U02 to determine whether the N1 frequency sub-bands are idle.

In one embodiment, the N1 first-type access detections are respectively used by the U02 to determine whether a radio signal can be transmitted in the N1 time-frequency resource blocks.

In one embodiment, the N1 first-type access detections are used by the U02 to determine that a radio signal can be transmitted in only the N time-frequency resource blocks of the N1 time-frequency resource blocks.

In one embodiment, the N1 is greater than the N, the N1 first-type access detections being used by the U02 to determine that no radio signal can be transmitted in any of the N1 time-frequency resource blocks not belonging to the N time-frequency resource blocks.

In one embodiment, the N time-frequency resource blocks respectively belong to N frequency sub-bands of the N1 frequency sub-bands in frequency domain, the N1 first-type access detections being used by the U02 to determine that only the N frequency sub-bands of the N1 frequency sub-bands are idle.

In one embodiment, the N time-frequency resource blocks respectively belong to N frequency sub-bands of the N1 frequency sub-bands in frequency domain, N first-type access detections are first-type access detections of the N1 first-type access detections that are respectively performed on the N frequency sub-bands, and the N first-type access detections are respectively used by the U02 to determine that the N radio signals are respectively transmitted in the N time-frequency resource blocks.

In one embodiment, the N1 is greater than the N, N1−N time-frequency resource block(s) is(are) composed of time-frequency resource block(s) of the N1 time-frequency resource blocks not belonging to the N time-frequency resource blocks, and the N1−N time-frequency resource block(s) respectively belongs(belong) to N1−N frequency sub-band(s) of the N1 frequency sub-bands in frequency domain; N1−N first-type access detection(s) of the N1 first-type access detections is(are) respectively performed on the N1−N frequency sub-band(s), and the N1−N first-type access detection(s) is(are) respectively used by the U02 to determine that no radio signal can be transmitted in any of the N1−N time-frequency resource block(s).

In one embodiment, end times of the N1 first-type access detections are respectively no later than start times of the N1 time-frequency resource blocks.

In one embodiment, end times of the N1 first-type access detections are respectively earlier than start times of the N1 time-frequency resource blocks.

In one embodiment, any of the N1 first-type access detections is LBT.

In one embodiment, any of the N1 first-type access detections is a Clear Channel Assessment (CCA).

In one embodiment, any of the N1 first-type access detections is an uplink access detection.

In one embodiment, the N1 second-type access detections are respectively used to determine whether the N1 frequency sub-bands are idle.

In one embodiment, the N1 second-type access detections are respectively used by the N01 to determine whether a radio signal can be transmitted in the N1 time-frequency resource blocks.

In one embodiment, the N1 second-type access detections are used by the N01 to determine that a radio signal can be transmitted in only the N time-frequency resource blocks of the N1 time-frequency resource blocks.

In one embodiment, the N1 is greater than the N, the N1 second-type access detections being used by the N01 to determine that no radio signal can be transmitted in any of the N1 time-frequency resource blocks not belonging to the N time-frequency resource blocks.

In one embodiment, the N time-frequency resource blocks respectively belong to N frequency sub-bands of the N1 frequency sub-bands in frequency domain, the N1 second-type access detections being used by the N01 to determine that only the N frequency sub-bands of the N1 frequency sub-bands are idle.

In one embodiment, the N time-frequency resource blocks respectively belong to N frequency sub-bands of the N1 frequency sub-bands in frequency domain, N second-type access detections are second-type access detections of the N1 second-type access detections that are respectively performed on the N frequency sub-bands, and the N second-type access detections are respectively used by the N01 to determine that the N radio signals are respectively transmitted in the N time-frequency resource blocks.

In one embodiment, the N1 is greater than the N, N1−N time-frequency resource block(s) is(are) composed of time-frequency resource block(s) of the N1 time-frequency resource blocks not belonging to the N time-frequency resource blocks, and the N1−N time-frequency resource block(s) respectively belongs(belong) to N1−N frequency sub-band(s) of the N1 frequency sub-bands in frequency domain; N1−N second-type access detection(s) of the N1 second-type access detections is(are) respectively performed on the N1−N frequency sub-band(s), and the N1−N second-type access detection(s) is(are) respectively used by the N01 to determine that no radio signal can be transmitted in any of the N1−N time-frequency resource block(s).

In one embodiment, end times of the N1 second-type access detections are respectively no later than start times of the N1 time-frequency resource blocks.

In one embodiment, end times of the N1 second-type access detections are respectively earlier than start times of the N1 time-frequency resource blocks.

In one embodiment, any of the N1 second-type access detections is LBT.

In one embodiment, any of the N1 second-type access detections is a CCA.

In one embodiment, any of the N1 second-type access detections is a downlink access detection.

Embodiment 6

Figure 6:
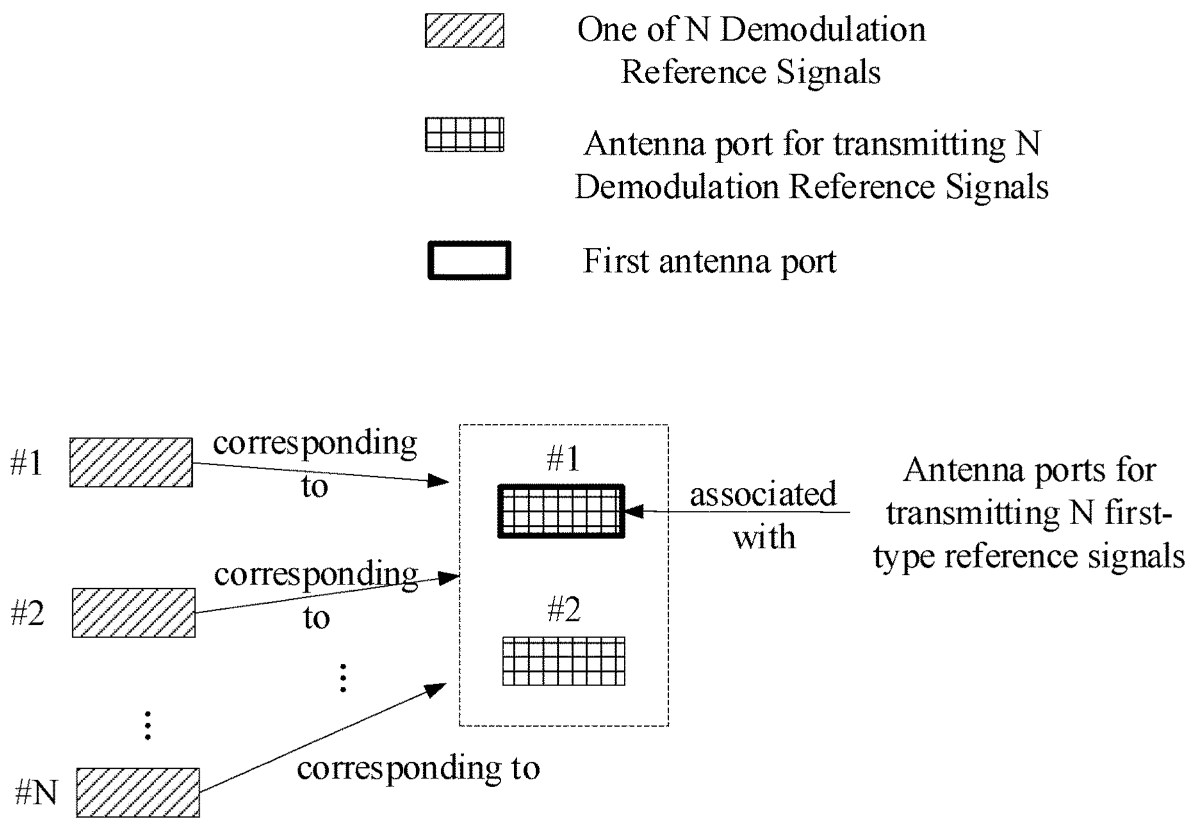
FIG. 6 illustrates a schematic diagram of a first antenna port according to one embodiment of the present disclosure.
Figure 7A:
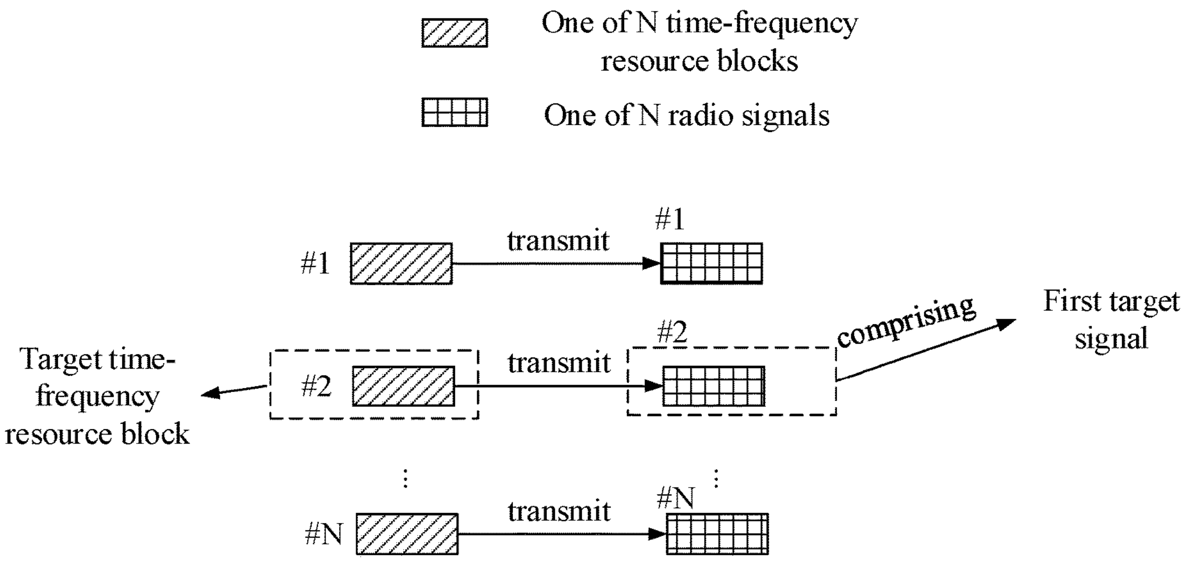
FIG. 7A-FIG. 7B respectively illustrate a schematic diagram of a target time-frequency resource block according to one embodiment of the present disclosure.
Figure 7B:
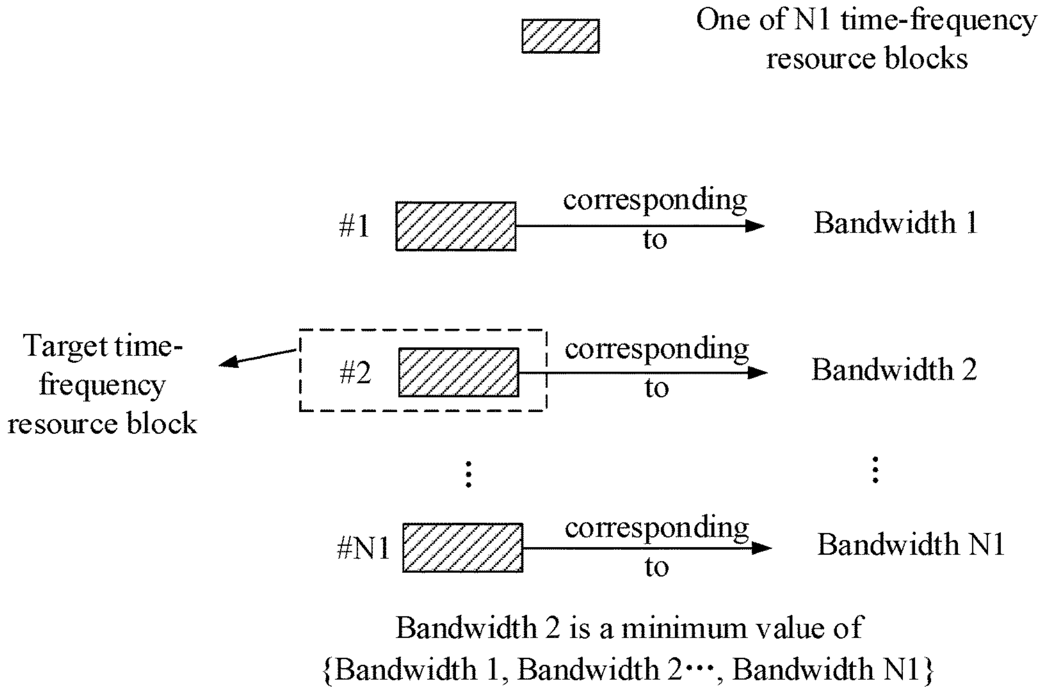

Embodiment 6 illustrates a schematic diagram of a first antenna port, as shown in FIG. 6.

In Embodiment 6, the N radio signals in the present disclosure respectively comprise N Demodulation Reference Signals (DMRSs), antenna ports for transmitting the N first-type reference signals in the present disclosure are the same, and antenna ports for transmitting the N DMRSs are the same, the first antenna port being one antenna port for transmitting the N DMRSs.

In one embodiment, each of the N DMRSs comprises DeModulation Reference Signals (DMRS).

In one embodiment, each of the N DMRSs is transmitted only by one antenna port, the first antenna port being an antenna port for transmitting each of the N DMRSs.

In one embodiment, the first antenna port is pre-defined.

In one embodiment, each of the N DMRSs is transmitted by P antenna ports, the first antenna port being one of the P antenna ports, the P being a positive integer greater than 1.

In one subembodiment, the first signaling is a Downlink Grant DCI signaling, the operating action being receiving.

In one subembodiment, the N radio signals comprise a transmission of a codeword, and the first antenna port is one of the P antenna ports that is of a lowest index.

In one subembodiment, the N radio signals comprise a transmission of two codewords, and P1 antenna port(s) is(are) antenna port(s) of the P antenna ports assigned for a codeword with higher MCS between the two codewords, P1 being a positive integer no greater than the P; when the P1 is equal to 1, the first antenna port is the P1 antenna port; when the P1 is greater than 1, the first antenna port is one of the P1 antenna ports of a lowest index.

In one subembodiment, the P antenna ports are divided into two antenna port subsets, any of the P antenna ports belonging to just one of the two antenna port subsets and any antenna port comprised in either of the two antenna port subsets is an antenna port of the P antenna ports; the first antenna port is an antenna port of a lowest index in one of the two antenna port subsets.

In one embodiment, the first signaling is also used to determine the first antenna port.

In one embodiment, the first signaling comprises a first field, the first field comprised in the first signaling being used to determine the first antenna port; the first antenna port is one of P antenna ports, P being a positive integer greater than 1.

In one subembodiment, the first field comprised in the first signaling indicates an index of the first antenna port.

In one subembodiment, the first field comprised in the first signaling indicates an index of the first antenna port in the P antenna ports.

In one subembodiment, the first field comprised in the first signaling indicates an index of the first antenna port of P2 antenna ports, and any of the P2 antenna ports is one of the P antenna ports, P2 being a positive integer no greater than the P.

In one subembodiment, the first signaling is an Uplink Grant DCI signaling, and the operating action is transmitting.

In one subembodiment, the first field comprised in the first signaling comprises a positive integer number of bit(s).

In one subembodiment, the first field comprised in the first signaling is PTRS-DMRS association, for the detailed definition of the PTRS-DMRS association, refer to 3GPP TS38.212, section 7.3.1.1.2.

Embodiment 7

Embodiment 7A-Embodiment 7B respectively illustrate a schematic diagram of a target time-frequency resource block.

In Embodiment 7A, the target time-frequency resource block is one of the N time-frequency resource blocks in the present disclosure that comprises time-frequency resources occupied by the first target signal in the present disclosure.

In one embodiment, frequency densities of the N first-type reference signals are respectively related to the N time-frequency resource blocks.

In one embodiment, bandwidths of the N time-frequency resource blocks are respectively used to determine frequency densities of the N first-type reference signals.

In Embodiment 7B, the target time-frequency resource block is one of the N1 time-frequency resource blocks in the present disclosure that is of a minimum bandwidth.

In one embodiment, N1 bandwidths are bandwidths of the N1 time-frequency resource blocks respectively, a first minimum bandwidth being a smallest one of the N1 bandwidths, and the target time-frequency resource block is one of the N1 time-frequency resource blocks that is of a bandwidth equal to the first minimum bandwidth.

In one embodiment, frequency density of each of the N first-type reference signals is related to the target time-frequency resource block.

In one embodiment, the N first-type reference signals are of equal frequency density, and the target time-frequency resource block's bandwidth is used to determine frequency density of any first-type reference signal of the N first-type reference signals.

Embodiment 8

Figure 8:
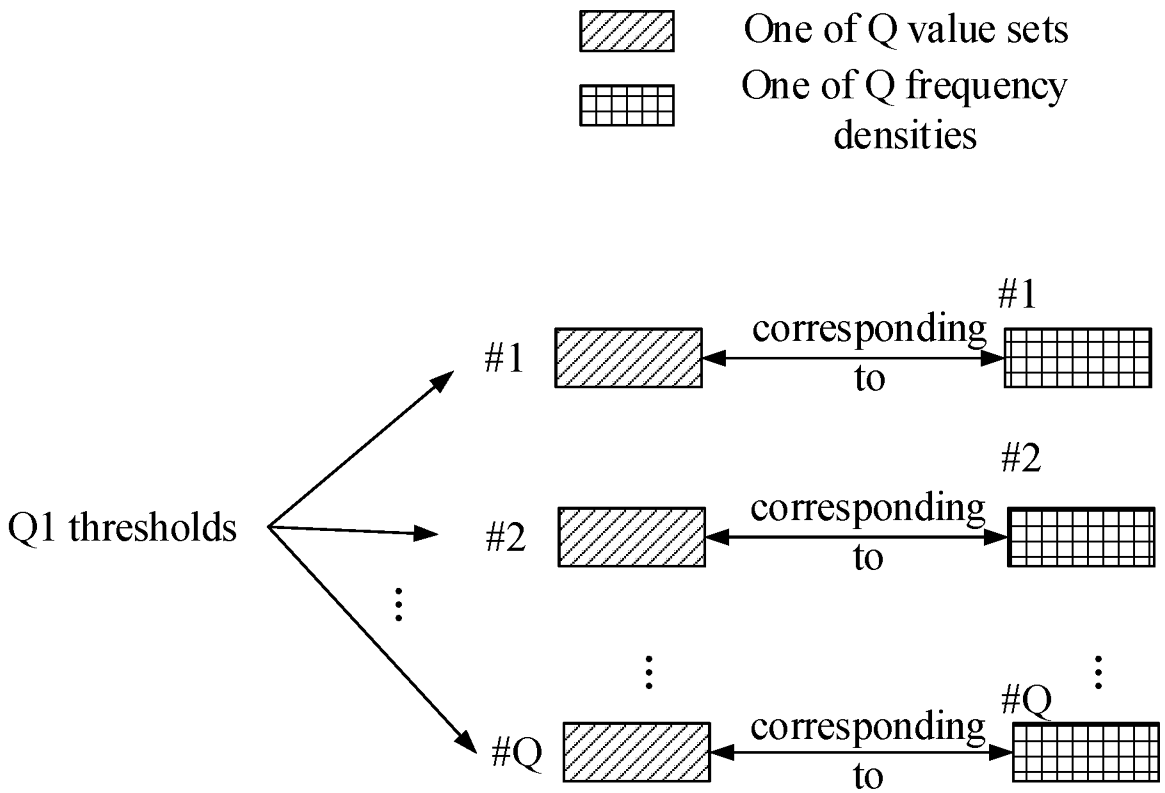
FIG. 8 illustrates a schematic diagram of Q1 threshold(s) being used to determine Q value sets according to one embodiment of the present disclosure.

Embodiment 8 illustrates a schematic diagram of Q1 threshold(s) being used to determine Q value sets, as shown in FIG. 8.

In Embodiment 8, the second information in the present disclosure indicates the Q1 threshold(s), the Q1 threshold(s) being used to determine Q value sets; the Q value sets respectively correspond to Q frequency densities, Q1 being a positive integer, and Q being a positive integer greater than 1.

In one embodiment, any two of the Q value sets are unequal, and any two of the Q frequency densities are unequal.

In one embodiment, the Q1 is greater than 1.

In one embodiment, the Q1 is equal to 2.

In one embodiment, the Q1 is equal to the Q.

In one embodiment, the Q1 is greater than the Q.

In one embodiment, the Q1 thresholds are positive integers.

In one embodiment, each of the Q1 thresholds is a positive integer no greater than 276.

In one embodiment, any two of the Q value sets do not comprise a same value.

In one embodiment, any value in the Q value sets belongs to only one value set of the Q value sets.

In one embodiment, any of the Q value sets comprises a positive integer number of value(s).

In one embodiment, any of the Q value sets comprises a positive integer number of consecutive positive integers.

In one embodiment, the Q frequency densities are Q positive integers that are mutually unequal.

In one embodiment, the Q is equal to 2, the Q frequency densities respectively being 4 and 2 in a descending order.

In one embodiment, a greater value of the Q frequency densities represents sparser frequency-domain distribution.

In one embodiment, Q thresholds are all mutually unequal thresholds out of the Q1 thresholds, the Q1 being a positive integer no less than the Q; the Q thresholds are respectively $b_0, b_1, \ldots, b_{Q-1}$ in an ascending order; $b_Q$ is a positive integer greater than $b_{Q-1}$; the Q frequency densities are respectively $K_0, K_1, \ldots, K_{Q-1}$ in an ascending order; an i-th value set of the Q value sets is $[b_i, b_{i+1})$, and the i-th value set corresponds to $K_i$, i=0, 1 . . . , Q−1.

In one subembodiment, any two of the Q1 thresholds are unequal, the Q thresholds being the Q1 thresholds respectively.

In one subembodiment, the $b_Q$ is pre-defined.

In one subembodiment, the $b_Q$ is configurable.

In one subembodiment, the $b_Q$ is a maximum scheduled bandwidth.

In one subembodiment, the $b_Q$ is positive infinity.

In one embodiment, the operating action is receiving, and the Q1 is equal to 2, an i-th threshold of the Q1 thresholds being $N_{RBi}$, i=0, 1; the detailed definition of the $N_{RBi}$ and specific implementation of how the Q1 thresholds are used to determine Q value sets can be found in 3GPP TS38.214, section 5.1.6.3.

In one embodiment, the operating action is transmitting, and the Q1 is equal to 2, an i-th threshold of the Q1 thresholds being $N_{RBi}$, i=0, 1; the detailed definition of the $N_{RBi}$ and specific implementation of how the Q1 thresholds are used to determine Q value sets can be found in 3GPP TS38.214, section 6.2.3.1.

Embodiment 9

Figure 9:
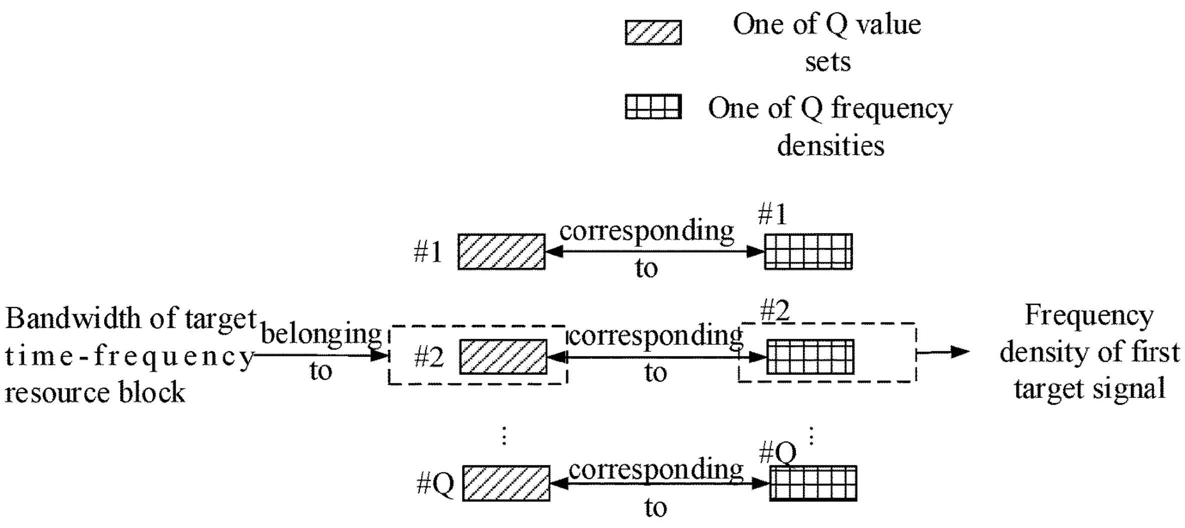
FIG. 9 illustrates a schematic diagram of a relation between frequency density of a first target signal and a target time-frequency resource block according to one embodiment of the present disclosure.

Embodiment 9 illustrates a schematic diagram of a relation between frequency density of a first target signal and a target time-frequency resource block, as shown in FIG. 9.

In Embodiment 9, the Q value sets in the present disclosure respectively correspond to the Q frequency densities in the present disclosure, Q1 being a positive integer, and Q being a positive integer greater than 1; a bandwidth of the target time-frequency resource block is used to determine the frequency density of the first target signal out of the Q frequency densities, and the bandwidth of the target time-frequency resource block belongs to only one value set of the Q value sets.

In one embodiment, a first value set is one of the Q value sets to which the bandwidth of the target time-frequency resource block belongs, and the frequency density of the first target signal is one of the Q frequency densities that corresponds to the first value set.

Embodiment 10

Figure 10:
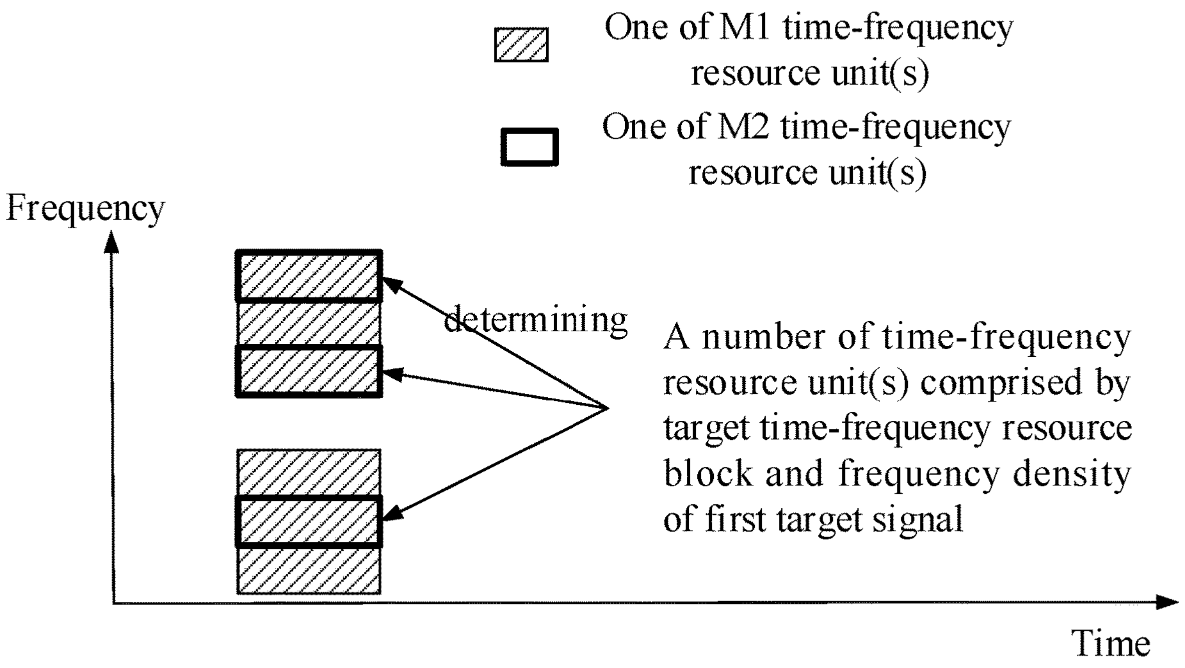
FIG. 10 illustrates a schematic diagram of determining time-frequency resources occupied by N first-type reference signals according to one embodiment of the present disclosure.

Embodiment 10 illustrates a schematic diagram of determining time-frequency resources occupied by N first-type reference signals, as shown in FIG. 10.

In Embodiment 10, a first target signal is any first-type reference signal of the N first-type reference signals; any of the N1 time-frequency resource blocks in the present disclosure comprises a positive integer number of time-frequency resource unit(s), any two of the N1 time-frequency resource blocks being orthogonal in frequency domain; a first time-frequency resource block is one of the N time-frequency resource blocks in the present disclosure that comprises time-frequency resources occupied by the first target signal, and the first time-frequency resource block comprises M1 time-frequency resource unit(s), and the time-frequency resources occupied by the first target signal belong to only M2 time-frequency resource unit(s) of the M1 time-frequency resource unit(s); a number of the time-frequency resource unit(s) comprised by the target time-frequency resource block and the frequency density of the first target signal in the present disclosure are used to determine the M2 time-frequency resource unit(s) out of the M1 time-frequency resource unit(s); M1 is a positive integer, and M2 is a positive integer no greater than the M1.

In one embodiment, the time-frequency resource unit comprises an RB in frequency domain.

In one embodiment, the time-frequency resource unit comprises a positive integer number of consecutive subcarriers in frequency domain.

In one embodiment, any two of the N1 time-frequency resource blocks occupy a same time-domain resource.

In one embodiment, time-frequency resources occupied by any two of the N1 time-frequency resource blocks are of a same size.

In one embodiment, any two of the N1 time-frequency resource blocks occupy equal numbers of REs.

In one embodiment, any two of the N1 time-frequency resource blocks occupy equal numbers of subcarriers in frequency domain, and any two of the N1 time-frequency resource blocks occupy equal numbers of multicarrier symbols in time domain.

In one embodiment, the first target signal occupies a positive integer number of RE(s) on a subcarrier in any time-frequency resource unit of the M2 time-frequency resource unit(s).

In one embodiment, the M1 is greater than 1, and the M2 is greater than 1, indexes of the M1 time-frequency resource units are respectively 0, 1 . . . , and M1−1 according to an ascending order of frequency; an absolute value of a difference between indexes of any two of the M2 time-frequency resource units is equal to a positive integral multiple of the frequency density of the first target signal.

In one embodiment, the M1 is greater than 1, and the M2 is greater than 1, indexes of the M1 time-frequency resource units are respectively 0, 1 . . . , and M1−1 according to an ascending order of frequency; an absolute value of a difference between indexes of any two adjacent time-frequency resource units of the M2 time-frequency resource units is equal to the frequency density of the first target signal.

Embodiment 11

Figure 11:
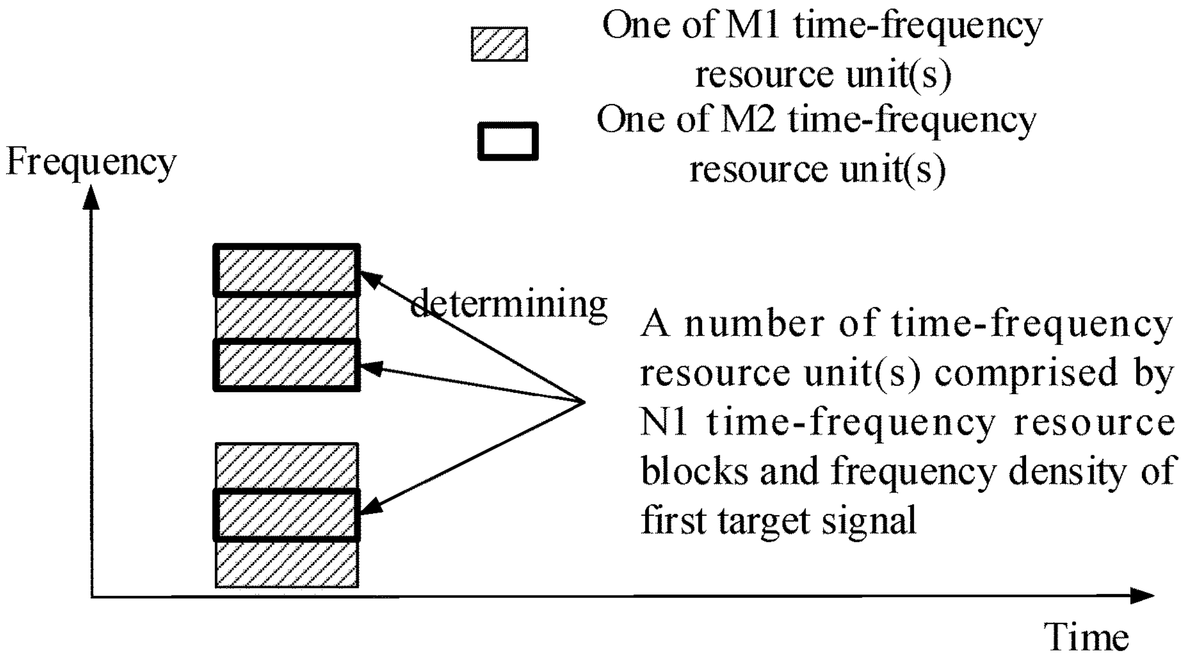
FIG. 11 illustrates a schematic diagram of determining time-frequency resources occupied by N first-type reference signals according to another embodiment of the present disclosure.

Embodiment 11 illustrates another schematic diagram of determining time-frequency resources occupied by N first-type reference signals, as shown in FIG. 11.

In Embodiment 11, a first target signal is any first-type reference signal of the N first-type reference signals; any of the N1 time-frequency resource blocks in the present disclosure comprises a positive integer number of time-frequency resource unit(s), any two of the N1 time-frequency resource blocks being orthogonal in frequency domain; a first time-frequency resource block is one of the N time-frequency resource blocks in the present disclosure that comprises time-frequency resources occupied by the first target signal, and the first time-frequency resource block comprises M1 time-frequency resource unit(s), and the time-frequency resources occupied by the first target signal belong to only M2 time-frequency resource unit(s) of the M1 time-frequency resource unit(s); a number of the time-frequency resource unit(s) comprised by the target time-frequency resource block and the frequency density of the first target signal are used to determine the M2 time-frequency resource unit(s) out of the M1 time-frequency resource unit(s).

Embodiment 12

Figure 12:
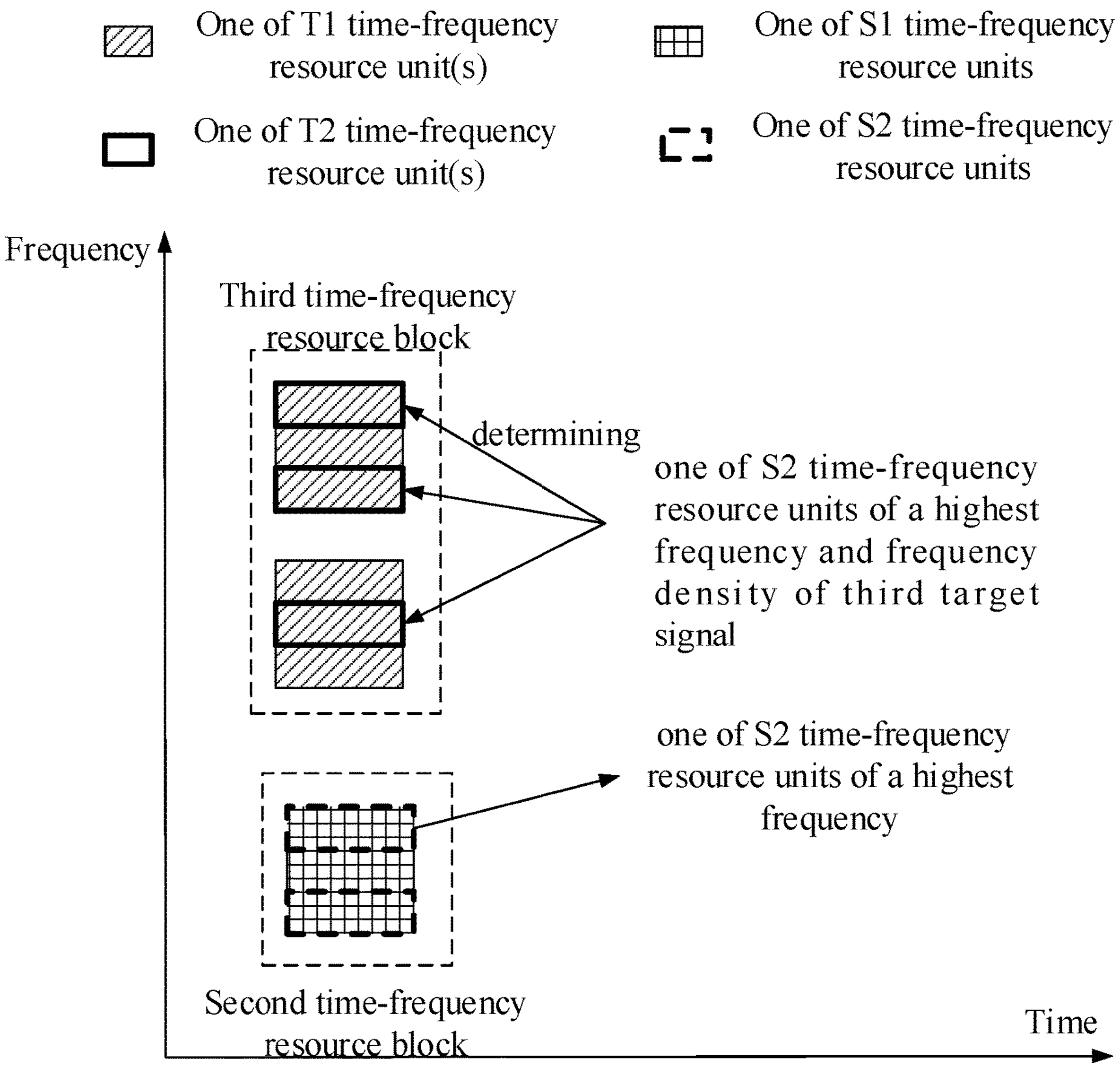
FIG. 12 illustrates a schematic diagram of determining time-frequency resources occupied by N first-type reference signals according to another embodiment of the present disclosure.

Embodiment 12 illustrates another schematic diagram of determining time-frequency resources occupied by N first-type reference signals, as shown in FIG. 12.

In Embodiment 12, any of the N1 time-frequency resource blocks in the present disclosure comprises a positive integer number of time-frequency resource unit(s), and any two time-frequency resource units of the N1 time-frequency resource blocks are orthogonal in frequency domain; the N is greater than 1, a second time-frequency resource block and a third time-frequency resource block are any two time-frequency resource blocks of the N time-frequency resource blocks that are adjacent in frequency domain, the third time-frequency resource block being of a higher frequency than the second time-frequency resource block, and a second target signal and a third target signal are two first-type reference signals of the N first-type reference signals that are respectively transmitted in the second time-frequency resource block and the third time-frequency resource block; the second time-frequency resource block comprises S1 time-frequency resource units, while the time-frequency resources occupied by the second target signal belong to only S2 time-frequency resource units of the S1 time-frequency resource units; the third time-frequency resource block comprises T1 time-frequency resource unit(s), while the time-frequency resource block occupied by the third target signal belongs to only T2 time-frequency resource unit(s) of the T1 time-frequency resource unit(s); one of the S2 time-frequency resource units of a highest frequency and frequency density of the third target signal are used to determine the T2 time-frequency resource unit(s) out of the T1 time-frequency resource unit(s).

In one embodiment, the second target signal occupies a positive integer number of RE(s) on a subcarrier in any time-frequency resource unit of the S2 time-frequency resource units, while the third target signal occupies a positive integer number of RE(s) on a subcarrier in any time-frequency resource unit of the T2 time-frequency resource unit(s).

In one embodiment, one of the S2 time-frequency resource units of a highest frequency and frequency density of the third target signal are used to determine a third target unit out of the T1 time-frequency resource units; when the T2 is equal to 1, the third target unit is the T2 time-frequency resource unit; when the T2 is greater than 1, the third target unit is one of the T2 time-frequency resource units, and the third target unit and the frequency density of the third target signal are used to determine (T2−1) time-frequency resource unit(s) of the T2 time-frequency resource units other than the third target unit out of the T1 time-frequency resource units.

In one subembodiment, indexes of the S1 time-frequency resource units and the T1 time-frequency resource units according to an ascending order of frequency are respectively (S1+T1) consecutive non-negative integers; a difference obtained by subtracting an index of one of the S2 time-frequency resource units of a highest frequency from an index of the third target unit is equal to the frequency density of the third target signal.

In one subembodiment, the T1 is greater than 1, and the T2 is greater than 1, the third target unit being one of the T2 time-frequency resource units of a lowest frequency.

In one subembodiment, the T1 is greater than 1, and the T2 is greater than 1, the third target unit being one of the T2 time-frequency resource units of a smallest index.

In one subembodiment, indexes of the T1 time-frequency resource units according to an ascending order of frequency are respectively T1 consecutive non-negative integers; a difference obtained by subtracting an index of the third target unit from an index of any of the T2 time-frequency resource units other than the third target unit is equal to a positive integral multiple of the frequency density of the third target signal.

In one subembodiment, indexes of the T1 time-frequency resource units according to an ascending order of frequency are respectively T1 consecutive non-negative integers; an index of the third target unit is $k_3$, and the frequency density of the third target signal is $K_3$; an index of an i-th time-frequency resource unit of the T2 time-frequency resource units according to an ascending order of frequency is $iK_3+k_3$, i=0, 1 . . . , T2−1.

In one embodiment, the S1 is greater than 1, and the S2 is greater than 1, indexes of the S1 time-frequency resource units according to an ascending order of frequency are respectively S1 consecutive non-negative integers; an absolute value of a difference between indexes of any two of the S2 time-frequency resource units is equal to a positive integral multiple of the frequency density of the second target signal.

In one embodiment, the S1 is greater than 1, and the S2 is greater than 1, indexes of the S1 time-frequency resource units according to an ascending order of frequency are respectively S1 consecutive non-negative integers; an absolute value of a difference between indexes of any two adjacent time-frequency resource units of the S2 time-frequency resource units is equal to the frequency density of the second target signal.

In one embodiment, the T1 is greater than 1, and the T2 is greater than 1, indexes of the T1 time-frequency resource units according to an ascending order of frequency are respectively T1 consecutive non-negative integers; an absolute value of a difference between indexes of any two of the T2 time-frequency resource units is equal to a positive integral multiple of the frequency density of the third target signal.

In one embodiment, the T1 is greater than 1, and the T2 is greater than 1, indexes of the T1 time-frequency resource units according to an ascending order of frequency are respectively T1 consecutive non-negative integers; an absolute value of a difference between indexes of any two adjacent time-frequency resource units of the T2 time-frequency resource units is equal to the frequency density of the third target signal.

In one embodiment, a fourth time-frequency resource block is one of the N time-frequency resource blocks of a lowest frequency, and a fourth target signal is a first-type reference signal of the N first-type reference signals that is transmitted in the fourth time-frequency resource block; the fourth time-frequency resource block comprises W1 time-frequency resource units, while time-frequency resources occupied by the fourth target signal belong to only W2 time-frequency resource unit(s) of the W1 time-frequency resource units; a number of time-frequency resource units comprised in a fifth time-frequency resource block and frequency density of the fourth target signal are used to determine the W2 time-frequency resource unit(s) out of the W1 time-frequency resource units; W1 is a positive integer, and W2 is a positive integer no greater than the W1.

In one subembodiment, the fifth time-frequency resource block is the fourth time-frequency resource block.

In one subembodiment, the fifth time-frequency resource block is one of the N1 time-frequency resource blocks of a minimum bandwidth.

In one subembodiment, the target time-frequency resource block is one of the N1 time-frequency resource blocks of a minimum bandwidth, the fifth time-frequency resource block being the target time-frequency resource block.

In one subembodiment, the frequency density of the fourth target signal is related to only the fifth time-frequency resource block of the N1 time-frequency resource blocks.

In one subembodiment, bandwidth of the fifth time-frequency resource block is used to determine the frequency density of the fourth target signal out of the Q frequency densities, and the bandwidth of the fifth time-frequency resource block belongs to only one value set of the Q value sets.

Embodiment 13

Figure 13:
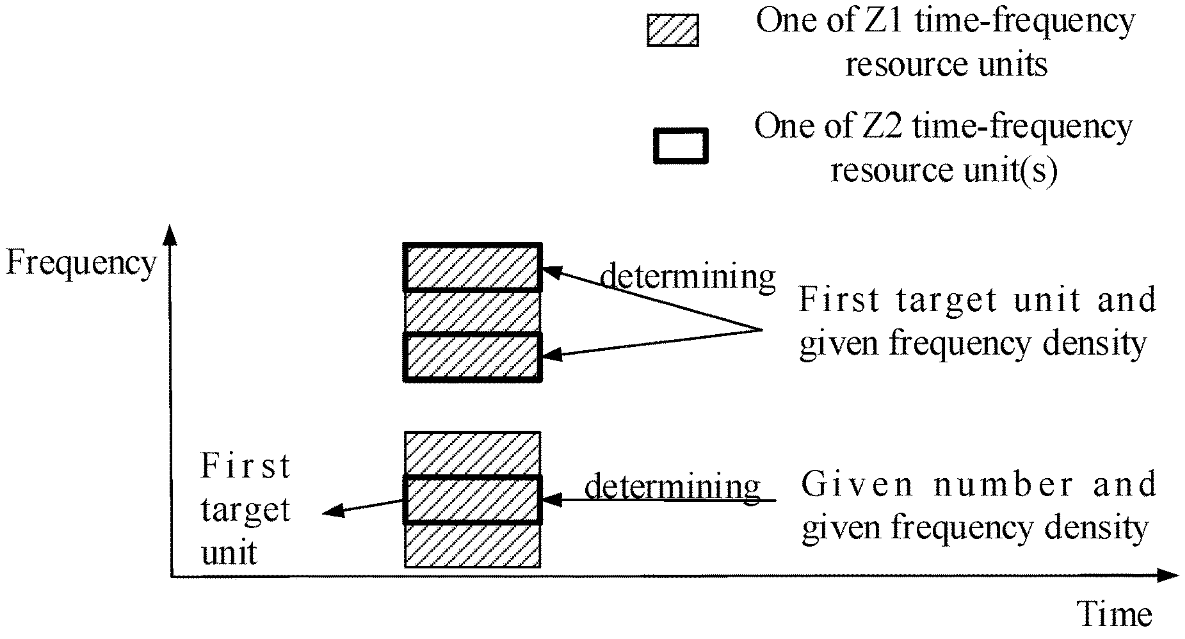
FIG. 13 illustrates a schematic diagram of a given number and a given frequency density being used to determine Z2 time-frequency resource unit(s) out of Z1 time-frequency resource units according to one embodiment of the present disclosure.

Embodiment 13 illustrates a schematic diagram of a given number and a given frequency density being used to determine Z2 time-frequency resource unit(s) out of Z1 time-frequency resource units, as shown in FIG. 13.

In Embodiment 13, the given number and the given frequency density are used to determine a first target unit out of the Z1 time-frequency resource units; when the Z2 is equal to 1, a first target unit is the Z2 time-frequency resource unit; when the Z2 is greater than 1, a first target unit is one of the Z2 time-frequency resource units, and the first target unit and the given frequency density are used to determine the Z2-1 time-frequency resource unit(s) of the Z2 time-frequency resource units other than the first target unit out of the Z1 time-frequency resource units; Z1 is a positive integer, and Z2 is a positive integer no greater than the M1. The given number corresponds to a number of the time-frequency resource units comprised in the target time-frequency resource block in the present disclosure, while the given frequency density corresponds to the frequency density of the first target signal in the present disclosure, the Z1 time-frequency resource units correspond to the M1 time-frequency resource units in the present disclosure, while the Z2 time-frequency resource unit(s) corresponds(correspond) to the M2 time-frequency resource unit(s) in the present disclosure; or, the given number corresponds to a number of the time-frequency resource units comprised by the N1 time-frequency resource blocks in the present disclosure, while the given frequency density corresponds to the frequency density of the first target signal in the present disclosure, the Z1 time-frequency resource units correspond to the M1 time-frequency resource units in the present disclosure, while the Z2 time-frequency resource unit(s) corresponds(correspond) to the M2 time-frequency resource unit(s) in the present disclosure; or, the given number corresponds to a number of the time-frequency resource units comprised by the fifth time-frequency resource block in the present disclosure, while the given frequency density corresponds to the frequency density of the fourth radio signal in the present disclosure, the Z1 time-frequency resource units correspond to W1 time-frequency resource units in the present disclosure, and the Z2 time-frequency resource unit(s) corresponds(correspond) to the W2 time-frequency resource unit(s) in the present disclosure.

In one embodiment, indexes of the Z1 time-frequency resource units according to an ascending order are respectively Z1 consecutive non-negative integers.

In one embodiment, indexes of the Z1 time-frequency resource units according to an ascending order are respectively 0, 1 . . . , and Z1−1.

In one embodiment, the Z1 is greater than 1, and the Z2 is greater than 1, the first target unit being one of the Z2 time-frequency resource units of a lowest frequency.

In one embodiment, the Z1 is greater than 1, and the Z2 is greater than 1, the first target unit being one of the Z2 time-frequency resource units of a smallest index.

In one embodiment, a difference obtained by subtracting an index of the first target unit from an index of any of the Z2 time-frequency resource units other than the first target unit is equal to a positive integral multiple of the given frequency density.

In one embodiment, an index of the first target unit is $k_{ref}^{RB}$, and the given frequency density is $K_{PT\text{-}RS}$; an index of an i-th time-frequency resource unit of the Z2 time-frequency resource units according to an ascending order of frequency is $iK_{PT\text{-}RS}+k_{ref}^{RB}$, i=0, 1 . . . , Z2−1.

In one embodiment, a first remainder is a remainder yielded by the given number mod the given frequency density, and a first identifier is a Radio Network Temporary Identifier (RNTI) of the first signaling in the present disclosure; when the first remainder is equal to 0, an index of the first target unit is equal to a remainder yielded by the first identifier mod the given frequency density; or when the first remainder is unequal to 0, an index of the first target unit is equal to a remainder yielded by the first identifier mod the first remainder.

In one embodiment, an index of the first target unit is $k_{ref}^{RB}$, and the given frequency density is $K_{PT\text{-}RS}$; the given number is $N_{RB}$, and a first identifier is an RNTI of the first signaling in the present disclosure, the first identifier being $n_{RNTI}$; when $N_{RB} \bmod K_{PT\text{-}RS}=0$, $k_{ref}^{RB}=n_{RNTI} \bmod K_{PT\text{-}RS}$; otherwise, $k_{ref}^{RB}=n_{RNTI} \bmod (N_{RB} \bmod K_{PT\text{-}RS})$.

Embodiment 14

Figure 14:
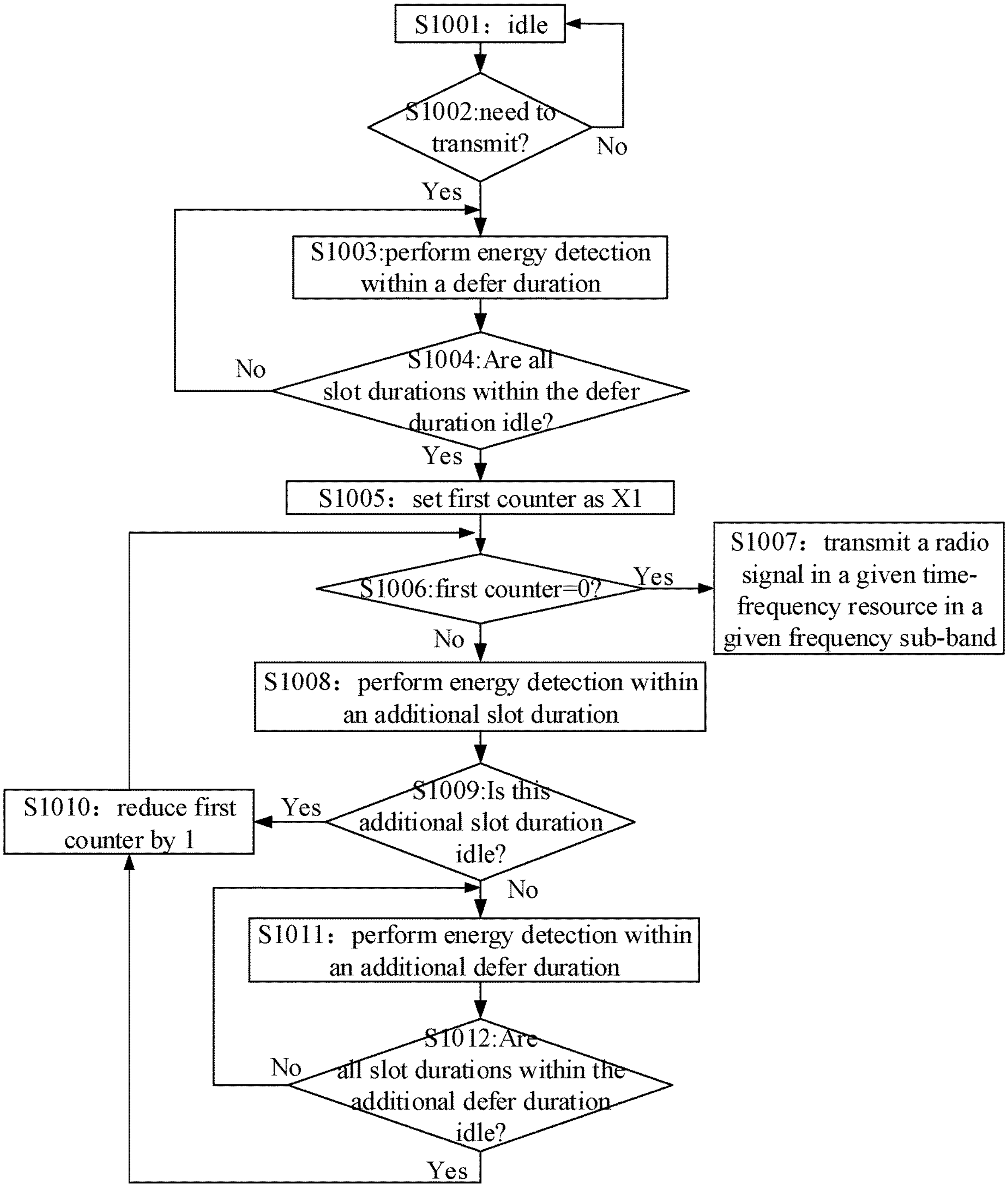
FIG. 14 illustrates a schematic diagram of a given access detection being used to determine whether to transmit a radio signal in a given time-frequency resource in a given frequency sub-band according to one embodiment of the present disclosure.

Embodiment 14 illustrates a schematic diagram of a given access detection being used to determine whether to transmit a radio signal in a given time-frequency resource in a given frequency sub-band; as shown in FIG. 14.

In Embodiment 14, the given access detection comprises performing X energy detection(s) respectively in X time sub-pool(s) on the given frequency sub-band, through which X detection value(s) is(are) obtained, X being a positive integer; an end time of the X time sub-pool(s) is no later than a given time, and the given time is a start time of the given time-frequency resource in the given frequency sub-band. The given access detection corresponds to the target access detection in the present disclosure, the given frequency sub-band corresponds to the first frequency band in the present disclosure, and the given time-frequency resource corresponds to the N time-frequency resource blocks in the present disclosure; or, the given access detection corresponds to one of the N1 first-type access detections in the present disclosure, the given frequency sub-band corresponds to one of the N1 frequency sub-bands in the present disclosure, and the given time-frequency resource corresponds to one of the N1 time-frequency resource blocks in the present disclosure. The process of the given access detection can be depicted by a flowchart in FIG. 14.

In FIG. 14, the base station or the UE in the present disclosure is idle in step S1001, and determines whether there is need to transmit in step S1002; performs energy detection in a defer duration in step S1003; and determines in step S1004 whether all slot durations within the defer duration are idle, if yes, move forward to step S1005 to set a first counter as X1, X1 being an integer no greater than the X; otherwise go back to step S1004; the base station or UE determines whether the first counter is 0 in step S1006, if yes, move forward to step S1007 to perform wireless transmission in a given time-frequency resource in the given frequency sub-band; otherwise, move forward to step S1008 to perform energy detection in an additional slot duration; and determines in step S1009 whether the additional slot duration is idle, if yes, move forward to step S1010 to reduce the first counter by 1 and then go back to step S1006; otherwise, move forward to step S1011 to perform energy detection in an additional defer duration; and determines in step S1012 whether all slot durations within the additional defer duration are idle, if yes, move back to step S1010; otherwise, go back to step S1011.

In Embodiment 14, the first counter in FIG. 14 is cleared to 0 ahead of the given time, and the given access detection produces a result of channel idleness, then wireless transmission can be performed in a given time-frequency resource in the given frequency sub-band; otherwise, transmitting a radio signal is dropped in the given time-frequency resource in the given frequency sub-band. The condition for clearing the first counter is that each of X1 detection value(s) of the X detection value(s) respectively corresponding to X1 of the X time sub-pool(s) is lower than a first reference threshold; a start time for the X1 time sub-pool(s) is after the step S1005 in FIG. 14.

In one embodiment, the X time sub-pool(s) comprises (comprise) all defer durations in FIG. 14.

In one embodiment, the X time sub-pool(s) comprises (comprise) part of defer durations in FIG. 14.

In one embodiment, the X time sub-pool(s) comprises (comprise) all defer durations and all additional slot durations in FIG. 14.

In one embodiment, the X time sub-pool(s) comprises (comprise) all defer durations and part of additional slot durations in FIG. 14.

In one embodiment, the X time sub-pool(s) comprises (comprise) all defer durations, all additional slot durations and all additional defer durations in FIG. 14.

In one embodiment, the X time sub-pool(s) comprises (comprise) all defer durations, part of additional slot durations and all additional defer durations in FIG. 14.

In one embodiment, the X time sub-pool(s) comprises (comprise) all defer durations, part of additional slot durations and part of additional defer durations in FIG. 14.

In one embodiment, any of the X time sub-pool(s) lasts either 16 μs or 9 μs.

In one embodiment, any slot duration within a given time duration refers to one of the X time sub-pool(s); the given time duration is any duration among all defer durations, all additional slot durations and all additional defer durations in FIG. 14.

In one embodiment, performing energy detection within a given time duration refers to performing energy detection in all slot durations within the given time duration; the given time duration is any duration among all defer durations, all additional slot durations and all additional defer durations in FIG. 14.

In one embodiment, a given time duration being determined as idle through energy detection means that all slot durations comprised in the given time duration are determined as idle through energy detection; the given time duration is any duration among all defer durations, all additional slot durations and all additional defer durations in FIG. 14.

In one embodiment, a given slot duration being determined to be idle through energy detection means that the base station or the UE senses power of all radio signals in a given time unit on the given frequency sub-band and averages in time, through which a received power obtained is lower than the first reference threshold; the given time unit is a consecutive duration in the given slot duration.

In one subembodiment of the above embodiment, the given time unit lasts no shorter than 4 μs.

In one embodiment, a given slot duration being determined to be idle through energy detection means that the base station or the UE senses energy of all radio signals in a given time unit on the given frequency sub-band and averages in time, through which a received energy obtained is lower than the first reference threshold; the given time unit is a consecutive duration in the given slot duration.

In one subembodiment of the above embodiment, the given time unit lasts no shorter than 4 μs.

In one embodiment, performing energy detection within a given time duration refers to performing energy detection in each of time sub-pool(s) within the given time duration; the given time duration is any duration among all defer durations, all additional slot durations and all additional defer durations in FIG. 14, each of the time sub-pool(s) belonging to the X time sub-pool(s).

In one embodiment, a given time duration being determined as idle through energy detection means that each of detection value(s) obtained through energy detection on time sub-pool(s) comprised in the given time duration is lower than the first reference threshold; the given time duration is any duration among all defer durations, all additional slot durations and all additional defer durations in FIG. 14, each of the time sub-pool(s) belonging to the X time sub-pool(s), each of the detection value(s) belonging to the X detection value(s).

In one embodiment, a defer duration lasts (16+Y1*9) μs, Y1 being a positive integer.

In one subembodiment of the above embodiment, a defer duration comprises Y1+1 time sub-pools of the X time sub-pools.

In one reference embodiment of the above subembodiment, a first time sub-pool of the Y1+1 time sub-pools lasts 16 μs, while each time sub-pool of the other Y1 time sub-pool(s) lasts 9 μs.

In one subembodiment, the given priority is used to determine the Y1.

In one reference embodiment of the above subembodiment, the given priority refers to Channel Access Priority Class, for the definition of the Channel Access Priority Class, refer to 3GPP TS36.213, section 15.

In one subembodiment, the Y1 is one among 1, 2, 3 and 7.

In one embodiment, a defer duration comprises multiple slot durations.

In one subembodiment, a first slot duration and a second slot duration of the multiple slot durations are non-consecutive.

In one subembodiment, a first slot duration and a second slot duration of the multiple slot durations are spaced by a time interval of 7 ms.

In one embodiment, an additional defer duration lasts (16+Y2*9) μs, Y2 being a positive integer.

In one subembodiment of the above embodiment, an additional defer duration comprises Y2+1 time sub-pools of the X time sub-pools.

In one reference embodiment of the above subembodiment, a first time sub-pool of the Y2+1 time sub-pools lasts 16 μs, while each time sub-pool of the other Y2 time sub-pool(s) lasts 9 μs.

In one subembodiment, the given priority is used to determine the Y2.

In one subembodiment, the Y2 is one among 1, 2, 3 and 7.

In one embodiment, a defer duration lasts as long as an additional defer duration.

In one embodiment, the Y1 is equal to the Y2.

In one embodiment, an additional defer duration comprises multiple slot durations.

In one subembodiment, a first slot duration and a second slot duration of the multiple slot durations are non-consecutive.

In one subembodiment, a first slot duration and a second slot duration of the multiple slot durations are spaced by a time interval of 7 ms.

In one embodiment, a slot duration lasts 9 μs.

In one embodiment, a slot duration is one of the X time sub-pool(s).

In one embodiment, an additional slot duration lasts 9 μs.

In one embodiment, an additional slot duration comprises one of the X time sub-pool(s).

In one embodiment, the X energy detection(s) is(are) used to determine whether the given frequency sub-band is idle.

In one embodiment, the X energy detection(s) is(are) used to determine whether the given frequency sub-band can be used by the base station or the UE for transmitting a radio signal.

In one embodiment, each of the X detection value(s) is measured by dBm.

In one embodiment, each of the X detection value(s) is measured by mW.

In one embodiment, each of the X detection value(s) is measured by Joule (J).

In one embodiment, the X1 is less than the X.

In one embodiment, the X is greater than 1.

In one embodiment, the first reference threshold is measured by dBm.

In one embodiment, the first reference threshold is measured by mW.

In one embodiment, the first reference threshold is measured by J.

In one embodiment, the first reference threshold is equal to or less than −72 dBm.

In one embodiment, the first reference threshold is any value equal to or less than a first given value.

In one subembodiment of the above embodiment, the first given value is pre-defined.

In one subembodiment of the above embodiment, the first given value is configured by a higher-layer signaling.

In one embodiment, the first reference threshold is liberally selected by the base station or the UE given that the first reference threshold is equal to or less than a first given value.

In one subembodiment of the above embodiment, the first given value is pre-defined.

In one subembodiment of the above embodiment, the first given value is configured by a higher-layer signaling.

In one embodiment, the X energy detection(s) is(are) energy detection(s) in a process of Cat 4 LBT, and the X1 is CWp in the Cat 4 LBT process, the CWp referring to contention window size, and the detailed definition of the CWp can be found in 3GPP TS36.213, section 15.

In one embodiment, at least one detection value of detection value(s) out of the X detection values not belonging to the X1 detection value(s) is lower than the first reference threshold.

In one embodiment, at least one detection value of detection value(s) out of the X detection values not belonging to the X1 detection value(s) is no lower than the first reference threshold.

In one embodiment, any two time sub-pools of the X1 time sub-pools are of equal duration.

In one embodiment, at least two of the X1 time sub-pools are of unequal durations.

In one embodiment, the X1 time sub-pool(s) comprises (comprise) a last time sub-pool of the X time sub-pools.

In one embodiment, the X1 time sub-pool(s) comprises (comprise) only slot durations in an eCCA.

In one embodiment, the X time sub-pools comprise the X1 time sub-pool(s) and the X2 time sub-pool(s), any of the X2 time sub-pool(s) not belonging to the X1 time sub-pool(s); X2 is a positive integer no greater than the X minus the X1.

In one subembodiment, the X2 time sub-pool(s) comprises(comprise) slot durations in an initial CCA.

In one subembodiment, the X2 time sub-pools are consecutive among the X time sub-pools.

In one subembodiment, at least one time sub-pool of the X2 time sub-pool(s) corresponds to a detection value lower than the first reference threshold.

In one subembodiment, at least one time sub-pool of the X2 time sub-pool(s) corresponds to a detection value no lower than the first reference threshold.

In one subembodiment, the X2 time sub-pool(s) comprises(comprise) all slot durations within all defer durations.

In one subembodiment, the X2 time sub-pool(s) comprises(comprise) all slot durations within at least one additional defer duration.

In one subembodiment, the X2 time sub-pool(s) comprises(comprise) at least one additional slot duration.

In one subembodiment, the X2 time sub-pool(s) comprises(comprise) all slot durations within all additional slot durations and all additional defer durations in FIG. 14 determined to be non-idle through energy detection.

In one subembodiment, the X1 time sub-pool(s) respectively belongs(belong) to X1 sub-pool set(s), and any of the X1 sub-pool set(s) comprises a positive integer number of time sub-pool(s) of the X time sub-pool(s); any time sub-pool comprised in the X1 sub-pool set(s) corresponds to a detection value lower than the first reference threshold.

In one subembodiment, at least one sub-pool set of the X1 sub-pool set(s) comprises one time sub-pool.

In one subembodiment, at least one sub-pool set of the X1 sub-pool set(s) comprises more than one time sub-pool.

In one subembodiment, at least two sub-pool sets of the X1 sub-pool sets comprise unequal numbers of time sub-pools.

In one subembodiment, none of the X time sub-pools belongs to two of the X1 sub-pool sets at the same time.

In one subembodiment, each time sub-pool in any sub-pool set of the X1 sub-pool sets belongs to a same additional defer duration or additional slot duration determined to be idle through energy detection.

In one subembodiment, at least one of time sub-pool(s) of the X time sub-pools not belonging to the X1 sub-pool set(s) corresponds to a detection value lower than the first reference threshold.

In one subembodiment, at least one of time sub-pool(s) of the X time sub-pools not belonging to the X1 sub-pool set(s) corresponds to a detection value no lower than the first reference threshold.

Embodiment 15

Figure 15:
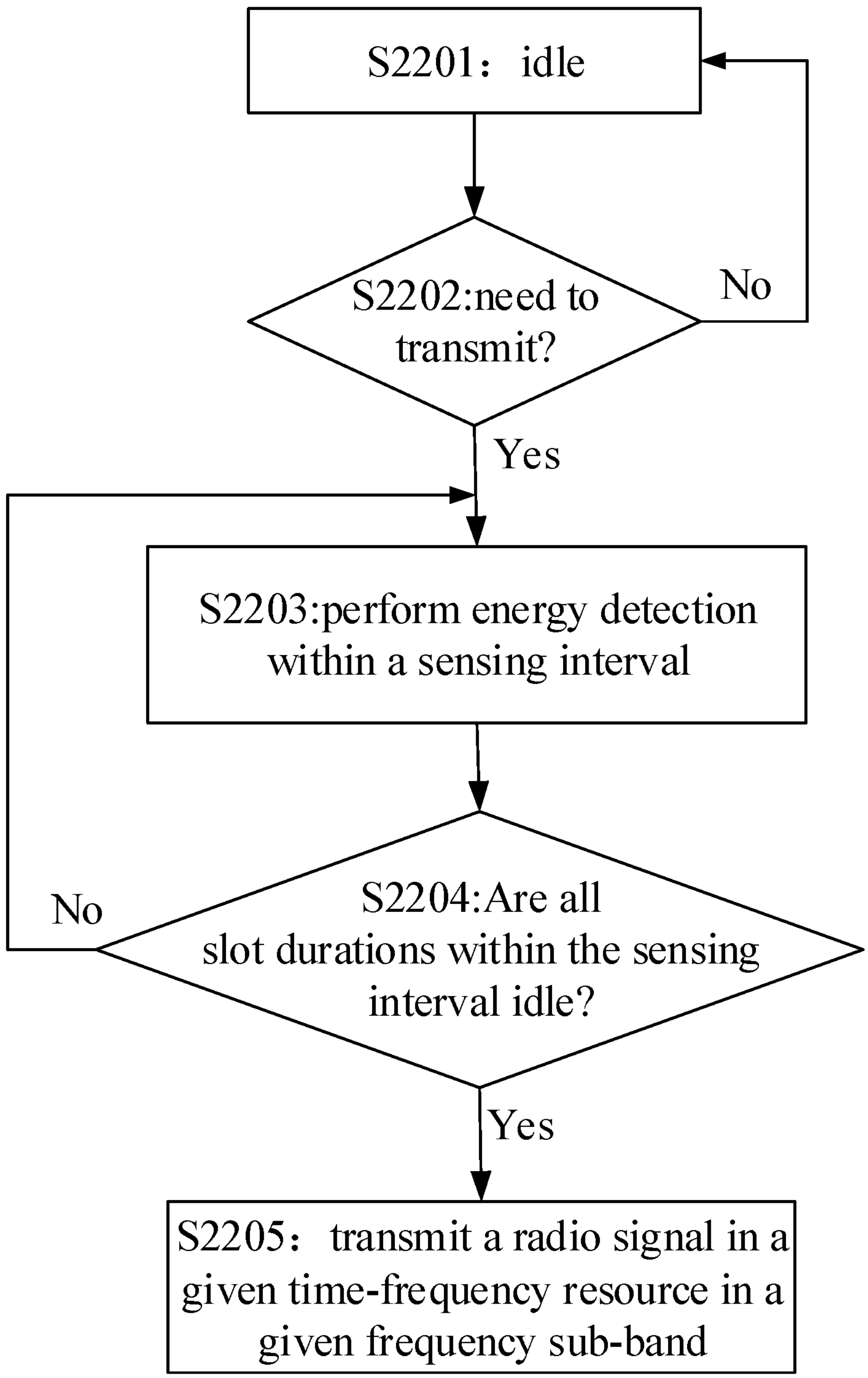
FIG. 15 illustrates a schematic diagram of a given access detection being used to determine whether to transmit a radio signal in a given time-frequency resource in a given frequency sub-band according to another embodiment of the present disclosure.

Embodiment 15 illustrates another schematic diagram of a given access detection being used to determine whether to transmit a radio signal in a given time-frequency resource in a given frequency sub-band; as shown in FIG. 15.

In Embodiment 15, the given access detection comprises performing X energy detection(s) respectively in X time sub-pool(s) on the given frequency sub-band, through which X detection value(s) is(are) obtained, X being a positive integer; an end time of the X time sub-pool(s) is no later than a given time, and the given time is a start time of the given time-frequency resource in the given frequency sub-band. The given access detection corresponds to the target access detection in the present disclosure, the given frequency sub-band corresponds to the first frequency band in the present disclosure, and the given time-frequency resource corresponds to the N time-frequency resource blocks in the present disclosure; or, the given access detection corresponds to one of the N1 first-type access detections in the present disclosure, the given frequency sub-band corresponds to one of the N1 frequency sub-bands in the present disclosure, and the given time-frequency resource corresponds to one of the N1 time-frequency resource blocks in the present disclosure; or, the given access detection corresponds to one of the N1 second-type access detections in the present disclosure, the given frequency sub-band corresponds to one of the N1 frequency sub-bands in the present disclosure, and the given time-frequency resource corresponds to one of the N1 time-frequency resource blocks in the present disclosure. The process of the given access detection can be depicted by a flowchart in FIG. 15.

In Embodiment 15, the UE in the present disclosure is idle in step S2201, and determines whether there is need to transmit in step S2202; performs energy detection in a sensing interval in step S2203; and determines in step S2204 whether all slot durations within the sensing interval are idle, if yes, move forward to step S2205 to transmit a radio signal in a given time-frequency resource in the given frequency sub-band; otherwise, go back to step S2203.

In Embodiment 15, a first given duration comprises a positive integer number of time sub-pool(s) of the X time sub-pool(s), and the first given duration is any duration in all sensing intervals comprised in FIG. 15. A second given duration comprises a time sub-pool of the X1 time sub-pool(s), and the second given duration is a sensing interval in FIG. 15 determined to be idle through energy detection.

In one embodiment, the detailed definition of the sensing interval can be found in 3GPP TS36.213, section 15.2.

In one embodiment, the X1 is equal to 2.

In one embodiment, the X1 is equal to the X.

In one embodiment, a sensing interval lasts 25 μs.

In one embodiment, a sensing interval comprises two slot durations, the two slot durations being non-consecutive in time domain.

In one subembodiment of the above embodiment, a time interval between the two slot durations is 7 μs.

In one embodiment, the X time sub-pool(s) comprises (comprise) listening time in Category 2 LBT.

In one embodiment, the X time sub-pool(s) comprises (comprise) slots within a sensing interval in a Type 2 UL channel access procedure, for the detailed definition of the sensing interval, refer to 3GPP TS36.213, section 15.2.

In one subembodiment of the above embodiment, the sensing interval lasts 25 μs.

In one embodiment, the X time sub-pool(s) comprises (comprise) Tf and Tsl within a sensing interval in a Type 2 UL channel access procedure, for the detailed definition of the Tf and the Tsl, refer to 3GPP TS36.213, section 15.2.

In one subembodiment of the above embodiment, the Tf lasts 16 μs.

In one subembodiment of the above embodiment, the Tsl lasts 9 μs.

In one embodiment, a first time sub-pool of the X1 time sub-pools lasts 16 μs, while a second time sub-pool of the X1 time sub-pools lasts 9 μs, the X1 being equal to 2.

In one embodiment, each of the X1 time sub-pools lasts 9 μs; a first time sub-pool and a second time sub-pool of the X1 time sub-pools are spaced by a time interval of 7 μs, the X1 being equal to 2.

Embodiment 16

Figure 16:
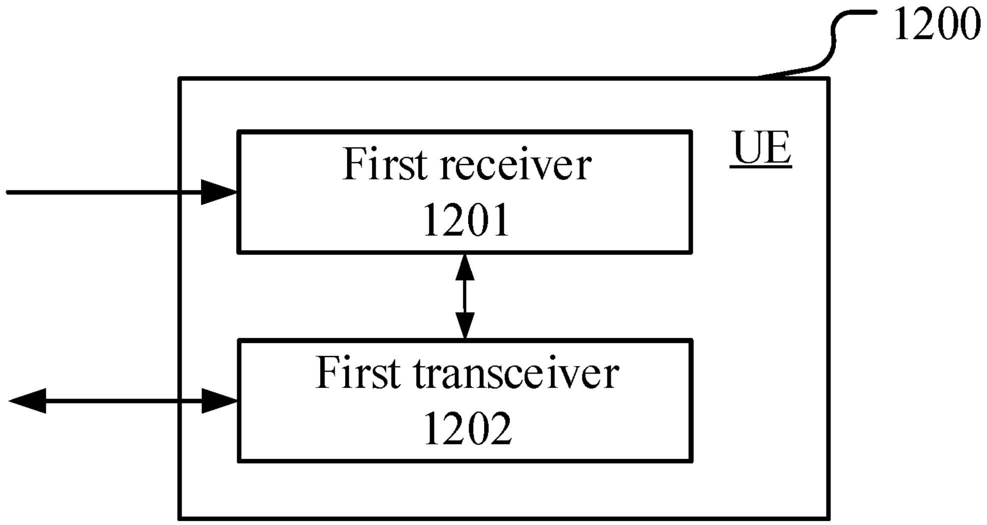
FIG. 16 illustrates a structure block diagram of a processing device in a UE according to one embodiment of the present disclosure.

Embodiment 16 illustrates a structure block diagram of a processing device in a UE, as shown in FIG. 16. In FIG. 16, a UE's processing device 1200 comprises a first receiver 1201 and a first transceiver 1202.

In one embodiment, the first receiver 1201 comprises the receiver 456, the receiving processor 452, the first processor 441 and the controller/processor 490 in Embodiment 4.

In one embodiment, the first receiver 1201 comprises at least the first three of the receiver 456, the receiving processor 452, the first processor 441 and the controller/processor 490 in Embodiment 4.

In one embodiment, the first receiver 1201 comprises at least the first two of the receiver 456, the receiving processor 452, the first processor 441 and the controller/processor 490 in Embodiment 4.

In one embodiment, the first transceiver 1202 comprises the transmitter/receiver 456, the transmitting processor 455, the receiving processor 452, the first processor 441 and the controller/processor 490 in Embodiment 4.

In one embodiment, the first transceiver 1202 comprises at least the first four of the transmitter/receiver 456, the transmitting processor 455, the receiving processor 452, the first processor 441 and the controller/processor 490 in Embodiment 4.

In one embodiment, the first transceiver 1202 comprises at least the first three of the transmitter/receiver 456, the transmitting processor 455, the receiving processor 452, the first processor 441 and the controller/processor 490 in Embodiment 4.

The first receiver 1201 receives a first signaling, the first signaling indicating N1 time-frequency resource blocks.

The first transceiver 1202 operates N radio signals respectively in N time-frequency resource blocks.

In Embodiment 16, the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the operating action is transmitting, or, the operating action is receiving.

In one embodiment, the N radio signals respectively comprise N Demodulation Reference Signals (DMRSs), antenna ports for transmitting the N first-type reference signals are the same, and antenna ports for transmitting the N DMRSs are the same, the first antenna port being one antenna port for transmitting the N DMRSs.

In one embodiment, the first receiver 1201 also receives first information; herein, the first information is used to determine M frequency sub-bands, any frequency sub-band of the N1 frequency sub-bands being one of the M frequency sub-bands; M is a positive integer no less than the N1.

In one embodiment, the target time-frequency resource block is one of the N time-frequency resource blocks that comprises time-frequency resources occupied by the first target signal, or, the target time-frequency resource block is one of the N1 time-frequency resource blocks that is of a minimum bandwidth.

In one embodiment, the first receiver 1201 also receives second information; herein, the second information indicates Q1 threshold(s), the Q1 threshold(s) being used to determine Q value sets; the Q value sets respectively correspond to Q frequency densities, Q1 being a positive integer, and Q being a positive integer greater than 1; a bandwidth of the target time-frequency resource block is used to determine the frequency density of the first target signal out of the Q frequency densities, and the bandwidth of the target time-frequency resource block belongs to only one value set of the Q value sets.

In one embodiment, any of the N1 time-frequency resource blocks comprises a positive integer number of time-frequency resource unit(s), and any two time-frequency resource units of the N1 time-frequency resource blocks are orthogonal in frequency domain; a first time-frequency resource block is one of the N time-frequency resource blocks that comprises time-frequency resources occupied by the first target signal, and the first time-frequency resource block comprises M1 time-frequency resource unit(s), and the time-frequency resources occupied by the first target signal belong to only M2 time-frequency resource unit(s) of the M1 time-frequency resource unit(s); a number of the time-frequency resource unit(s) comprised by the target time-frequency resource block and the frequency density of the first target signal are used to determine the M2 time-frequency resource unit(s) out of the M1 time-frequency resource unit(s); M1 is a positive integer, and M2 is a positive integer no greater than the M1.

In one embodiment, any of the N1 time-frequency resource blocks comprises a positive integer number of time-frequency resource unit(s), and any two time-frequency resource units of the N1 time-frequency resource blocks are orthogonal in frequency domain; the N is greater than 1, a second time-frequency resource block and a third time-frequency resource block are any two time-frequency resource blocks of the N time-frequency resource blocks that are adjacent in frequency domain, the third time-frequency resource block being of a higher frequency than the second time-frequency resource block, and a second target signal and a third target signal are two first-type reference signals of the N first-type reference signals that are respectively transmitted in the second time-frequency resource block and the third time-frequency resource block; the second time-frequency resource block comprises S1 time-frequency resource units, while the time-frequency resources occupied by the second target signal belong to only S2 time-frequency resource units of the S1 time-frequency resource units; the third time-frequency resource block comprises T1 time-frequency resource unit(s), while the time-frequency resource block occupied by the third target signal belongs to only T2 time-frequency resource unit(s) of the T1 time-frequency resource unit(s); one of the S2 time-frequency resource units of a highest frequency and frequency density of the third target signal are used to determine the T2 time-frequency resource unit(s) out of the T1 time-frequency resource unit(s).

In one embodiment, the first receiver 1201 performs a target access detection on a first frequency band, or, performs N1 first-type access detections respectively on the N1 frequency sub-bands; herein, the operating action is transmitting, and the first frequency band comprises the N1 frequency sub-bands, the target access detection is used to determine that the N radio signals are respectively transmitted in the N time-frequency resource blocks, and the N1 first-type access detections are used to determine that the N radio signals are respectively transmitted in the N time-frequency resource blocks.

Embodiment 17

Figure 17:
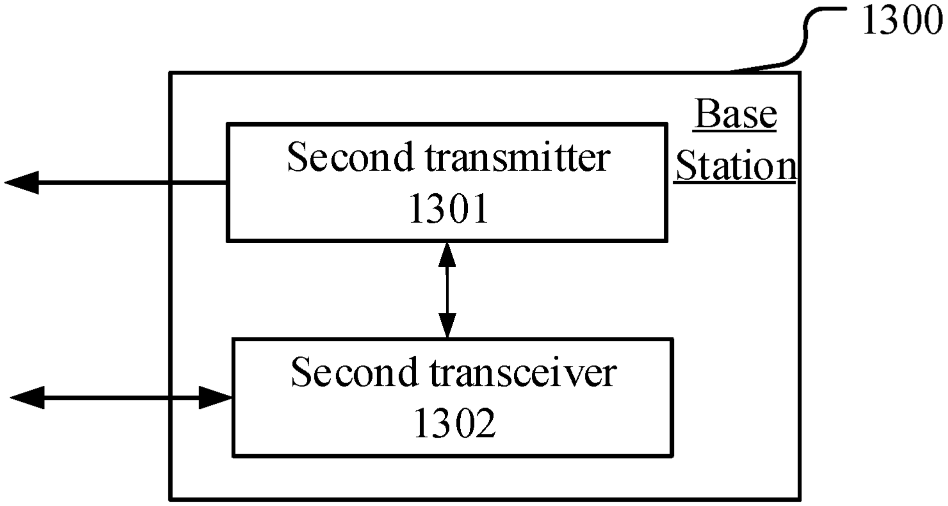
FIG. 17 illustrates a structure block diagram of a processing device in a base station according to one embodiment of the present disclosure.

Embodiment 17 illustrates a structure block diagram of a processing device in a base station, as shown in FIG. 17. In FIG. 17, a base station's processing device 1300 comprises a second transmitter 1301 and a second transceiver 1302.

In one embodiment, the second transmitter 1301 comprises the transmitter 416, the transmitting processor 415, the first processor 471 and the controller/processor 440 in Embodiment 4.

In one embodiment, the second transmitter 1301 comprises at least the first three of the transmitter 416, the transmitting processor 415, the first processor 471 and the controller/processor 440 in Embodiment 4.

In one embodiment, the second transmitter 1301 comprises at least the first two of the transmitter 416, the transmitting processor 415, the first processor 471 and the controller/processor 440 in Embodiment 4.

In one embodiment, the second transceiver 1302 comprises the transmitter/receiver 416, the receiving processor 412, the transmitting processor 415, the first processor 471 and the controller/processor 440 in Embodiment 4.

In one embodiment, the second transceiver 1302 comprises at least the first four of the transmitter/receiver 416, the receiving processor 412, the transmitting processor 415, the first processor 471 and the controller/processor 440 in Embodiment 4.

In one embodiment, the second transceiver 1302 comprises at least the first three of the transmitter/receiver 416, the receiving processor 412, the transmitting processor 415, the first processor 471 and the controller/processor 440 in Embodiment 4.

The second transmitter 1301 transmits a first signaling, the first signaling indicating N1 time-frequency resource blocks.

The second transceiver 1302 processes N radio signals respectively in N time-frequency resource blocks.

In Embodiment 17, the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the processing action is receiving, or, the processing action is transmitting.

In one embodiment, the N radio signals respectively comprise N Demodulation Reference Signals (DMRSs), antenna ports for transmitting the N first-type reference signals are the same, and antenna ports for transmitting the N DMRSs are the same, the first antenna port being one antenna port for transmitting the N DMRSs.

In one embodiment, the second transmitter 1301 also transmits first information; herein, the first information is used to determine M frequency sub-bands, any frequency sub-band of the N1 frequency sub-bands being one of the M frequency sub-bands; M is a positive integer no less than the N1.

In one embodiment, the target time-frequency resource block is one of the N time-frequency resource blocks that comprises time-frequency resources occupied by the first target signal, or, the target time-frequency resource block is one of the N1 time-frequency resource blocks that is of a minimum bandwidth.

In one embodiment, the second transmitter 1301 also transmits second information; herein, the second information indicates Q1 threshold(s), the Q1 threshold(s) being used to determine Q value sets; the Q value sets respectively correspond to Q frequency densities, Q1 being a positive integer, and Q being a positive integer greater than 1; a bandwidth of the target time-frequency resource block is used to determine the frequency density of the first target signal out of the Q frequency densities, and the bandwidth of the target time-frequency resource block belongs to only one value set of the Q value sets.

In one embodiment, any of the N1 time-frequency resource blocks comprises a positive integer number of time-frequency resource unit(s), and any two time-frequency resource units of the N1 time-frequency resource blocks are orthogonal in frequency domain; a first time-frequency resource block is one of the N time-frequency resource blocks that comprises time-frequency resources occupied by the first target signal, and the first time-frequency resource block comprises M1 time-frequency resource unit(s), and the time-frequency resources occupied by the first target signal belong to only M2 time-frequency resource unit(s) of the M1 time-frequency resource unit(s); a number of the time-frequency resource unit(s) comprised by the target time-frequency resource block and the frequency density of the first target signal are used to determine the M2 time-frequency resource unit(s) out of the M1 time-frequency resource unit(s); M1 is a positive integer, and M2 is a positive integer no greater than the M1.

In one embodiment, any of the N1 time-frequency resource blocks comprises a positive integer number of time-frequency resource unit(s), and any two time-frequency resource units of the N1 time-frequency resource blocks are orthogonal in frequency domain; the N is greater than 1, a second time-frequency resource block and a third time-frequency resource block are any two time-frequency resource blocks of the N time-frequency resource blocks that are adjacent in frequency domain, the third time-frequency resource block being of a higher frequency than the second time-frequency resource block, and a second target signal and a third target signal are two first-type reference signals of the N first-type reference signals that are respectively transmitted in the second time-frequency resource block and the third time-frequency resource block; the second time-frequency resource block comprises S1 time-frequency resource units, while the time-frequency resources occupied by the second target signal belong to only S2 time-frequency resource units of the S1 time-frequency resource units; the third time-frequency resource block comprises T1 time-frequency resource unit(s), while the time-frequency resource block occupied by the third target signal belongs to only T2 time-frequency resource unit(s) of the T1 time-frequency resource unit(s); one of the S2 time-frequency resource units of a highest frequency and frequency density of the third target signal are used to determine the T2 time-frequency resource unit(s) out of the T1 time-frequency resource unit(s).

In one embodiment, the second transceiver 1302 also performs N1 second-type access detections respectively on the N1 frequency sub-bands; herein, the processing action is transmitting, and the N1 second-type access detections are used to determine that the N radio signals are respectively transmitted in the N time-frequency resource blocks.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, comprising:

a first receiver, which receives a first signaling, the first signaling indicating N1 time-frequency resource blocks; and a first transceiver, which operates N radio signals respectively in N time-frequency resource blocks;

wherein the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the operating action is transmitting, or, the operating action is receiving.

2. The UE according to claim 1, wherein the N radio signals respectively comprise N sub-signals, and the N sub-signals respectively comprise N transmissions of a first bit block;

or, the N radio signals respectively comprise N Demodulation Reference Signals (DMRSs), antenna ports for transmitting the N first-type reference signals are the same, and antenna ports for transmitting the N DMRSs are the same, the first antenna port being one antenna port for transmitting the N DMRSs.

3. The UE according to claim 1, wherein the first receiver also receives first information; wherein the first information is used to determine M frequency sub-bands, any frequency sub-band of the N1 frequency sub-bands being one of the M frequency sub-bands; M is a positive integer no less than the N1;

or, the first receiver also receives second information; wherein the second information indicates Q1 threshold(s), the Q1 threshold(s) being used to determine Q value sets; the Q value sets respectively correspond to Q frequency densities, Q1 being a positive integer, and Q being a positive integer greater than 1; a bandwidth of the target time-frequency resource block is used to determine the frequency density of the first target signal out of the Q frequency densities, and the bandwidth of the target time-frequency resource block belongs to only one value set of the Q value sets.

4. The UE according to claim 1, wherein the target time-frequency resource block is one of the N time-frequency resource blocks that comprises time-frequency resources occupied by the first target signal, or, the target time-frequency resource block is one of the N1 time-frequency resource blocks that is of a minimum bandwidth.

5. The UE according to claim 1, wherein any of the N1 time-frequency resource blocks comprises a positive integer number of time-frequency resource unit(s), and any two time-frequency resource units of the N1 time-frequency resource blocks are orthogonal in frequency domain; a first time-frequency resource block is one of the N time-frequency resource blocks that comprises time-frequency resources occupied by the first target signal, and the first time-frequency resource block comprises M1 time-frequency resource unit(s), and the time-frequency resources occupied by the first target signal belong to only M2 time-frequency resource unit(s) of the M1 time-frequency resource unit(s); a number of the time-frequency resource unit(s) comprised by the target time-frequency resource block and the frequency density of the first target signal are used to determine the M2 time-frequency resource unit(s) out of the M1 time-frequency resource unit(s); M1 is a positive integer, and M2 is a positive integer no greater than the M1.

6. The UE according to claim 1, wherein any of the N1 time-frequency resource blocks comprises a positive integer number of time-frequency resource unit(s), and any two time-frequency resource units of the N1 time-frequency resource blocks are orthogonal in frequency domain; the N is greater than 1, a second time-frequency resource block and a third time-frequency resource block are any two time-frequency resource blocks of the N time-frequency resource blocks that are adjacent in frequency domain, the third time-frequency resource block being of a higher frequency than the second time-frequency resource block, and a second target signal and a third target signal are two first-type reference signals of the N first-type reference signals that are respectively transmitted in the second time-frequency resource block and the third time-frequency resource block; the second time-frequency resource block comprises S1 time-frequency resource units, while the time-frequency resources occupied by the second target signal belong to only S2 time-frequency resource units of the S1 time-frequency resource units; the third time-frequency resource block comprises T1 time-frequency resource unit(s), while the time-frequency resource block occupied by the third target signal belongs to only T2 time-frequency resource unit(s) of the T1 time-frequency resource unit(s); one of the S2 time-frequency resource units of a highest frequency and frequency density of the third target signal are used to determine the T2 time-frequency resource unit(s) out of the T1 time-frequency resource unit(s).

7. The UE according to claim 1, wherein the first receiver performs a target access detection on a first frequency band, or, performs N1 first-type access detections respectively on the N1 frequency sub-bands; wherein the operating action is transmitting, and the first frequency band comprises the N1 frequency sub-bands, the target access detection is used to determine that the N radio signals are respectively transmitted in the N time-frequency resource blocks, and the N1 first-type access detections are used to determine that the N radio signals are respectively transmitted in the N time-frequency resource blocks.

8. A base station for wireless communications, comprising:

a second transmitter, which transmits a first signaling, the first signaling indicating N1 time-frequency resource blocks; and a second transceiver, which processes N radio signals respectively in N time-frequency resource blocks;

wherein the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the processing action is receiving, or, the processing action is transmitting.

9. The base station according to claim 8, wherein the N radio signals respectively comprise N sub-signals, and the N sub-signals respectively comprise N transmissions of a first bit block;

or, the N radio signals respectively comprise N Demodulation Reference Signals (DMRSs), antenna ports for transmitting the N first-type reference signals are the same, and antenna ports for transmitting the N DMRSs are the same, the first antenna port being one antenna port for transmitting the N DMRSs.

10. The base station according to claim 8, wherein the second transmitter also transmits first information; wherein the first information is used to determine M frequency sub-bands, any frequency sub-band of the N1 frequency sub-bands being one of the M frequency sub-bands; M is a positive integer no less than the N1;

or, the second transmitter also transmits second information; wherein the second information indicates Q1 threshold(s), the Q1 threshold(s) being used to determine Q value sets; the Q value sets respectively correspond to Q frequency densities, Q1 being a positive integer, and Q being a positive integer greater than 1; a bandwidth of the target time-frequency resource block is used to determine the frequency density of the first target signal out of the Q frequency densities, and the bandwidth of the target time-frequency resource block belongs to only one value set of the Q value sets.

11. The base station according to claim 8, wherein the target time-frequency resource block is one of the N time-frequency resource blocks that comprises time-frequency resources occupied by the first target signal, or, the target time-frequency resource block is one of the N1 time-frequency resource blocks that is of a minimum bandwidth.

12. The base station according to claim 8, wherein any of the N1 time-frequency resource blocks comprises a positive integer number of time-frequency resource unit(s), and any two time-frequency resource units of the N1 time-frequency resource blocks are orthogonal in frequency domain; a first time-frequency resource block is one of the N time-frequency resource blocks that comprises time-frequency resources occupied by the first target signal, and the first time-frequency resource block comprises M1 time-frequency resource unit(s), and the time-frequency resources occupied by the first target signal belong to only M2 time-frequency resource unit(s) of the M1 time-frequency resource unit(s); a number of the time-frequency resource unit(s) comprised by the target time-frequency resource block and the frequency density of the first target signal are used to determine the M2 time-frequency resource unit(s) out of the M1 time-frequency resource unit(s); M1 is a positive integer, and M2 is a positive integer no greater than the M1.

13. The base station according to claim 8, wherein any of the N1 time-frequency resource blocks comprises a positive integer number of time-frequency resource unit(s), and any two time-frequency resource units of the N1 time-frequency resource blocks are orthogonal in frequency domain; the N is greater than 1, a second time-frequency resource block and a third time-frequency resource block are any two time-frequency resource blocks of the N time-frequency resource blocks that are adjacent in frequency domain, the third time-frequency resource block being of a higher frequency than the second time-frequency resource block, and a second target signal and a third target signal are two first-type reference signals of the N first-type reference signals that are respectively transmitted in the second time-frequency resource block and the third time-frequency resource block; the second time-frequency resource block comprises S1 time-frequency resource units, while the time-frequency resources occupied by the second target signal belong to only S2 time-frequency resource units of the S1 time-frequency resource units; the third time-frequency resource block comprises T1 time-frequency resource unit(s), while the time-frequency resource block occupied by the third target signal belongs to only T2 time-frequency resource unit(s) of the T1 time-frequency resource unit(s); one of the S2 time-frequency resource units of a highest frequency and frequency density of the third target signal are used to determine the T2 time-frequency resource unit(s) out of the T1 time-frequency resource unit(s).

14. The base station according to claim 8, wherein the second transceiver performs N1 second-type access detections respectively on the N1 frequency sub-bands; wherein the processing action is transmitting, and the N1 second-type access detections are used to determine that the N radio signals are respectively transmitted in the N time-frequency resource blocks.

15. A method in a UE for wireless communications, comprising:

receiving a first signaling, the first signaling indicating N1 time-frequency resource blocks; and operating N radio signals respectively in N time-frequency resource blocks;

wherein the N1 time-frequency resource blocks respectively belong to N1 frequency sub-bands in frequency domain, any two frequency sub-bands of the N1 frequency sub-bands being orthogonal, N1 being a positive integer greater than 1; any time-frequency resource block of the N time-frequency resource blocks is one of the N1 time-frequency resource blocks, N being a positive integer greater than 1 and no greater than the N1; the N radio signals respectively comprise N first-type reference signals, and an antenna port for transmitting each of the N first-type reference signals is associated with a first antenna port; a first target signal is any first-type reference signal of the N first-type reference signals, and frequency density of the first target signal is related to only a target time-frequency resource block of the N1 time-frequency resource blocks, the target time-frequency resource block being one of the N1 time-frequency resource blocks; the operating action is transmitting, or, the operating action is receiving.

16. The method according to claim 15, wherein the N radio signals respectively comprise N sub-signals, and the N sub-signals respectively comprise N transmissions of a first bit block;

or, the N radio signals respectively comprise N Demodulation Reference Signals (DMRSs), antenna ports for transmitting the N first-type reference signals are the same, and antenna ports for transmitting the N DMRSs are the same, the first antenna port being one antenna port for transmitting the N DMRSs.

17. The method according to claim 15, comprising:

receiving first information; wherein the first information is used to determine M frequency sub-bands, any frequency sub-band of the N1 frequency sub-bands being one of the M frequency sub-bands; M is a positive integer no less than the N1;

or, receiving second information; wherein the second information indicates Q1 threshold(s), the Q1 threshold(s) being used to determine Q value sets; the Q value sets respectively correspond to Q frequency densities, Q1 being a positive integer, and Q being a positive integer greater than 1; a bandwidth of the target time-frequency resource block is used to determine the frequency density of the first target signal out of the Q frequency densities, and the bandwidth of the target time-frequency resource block belongs to only one value set of the Q value sets;

or, performing a target access detection on a first frequency band, or, performing N1 first-type access detections respectively on the N1 frequency sub-bands; wherein the operating action is transmitting, and the first frequency band comprises the N1 frequency sub-bands, the target access detection is used to determine that the N radio signals are respectively transmitted in the N time-frequency resource blocks, and the N1 first-type access detections are used to determine that the N radio signals are respectively transmitted in the N time-frequency resource blocks.

18. The method according to claim 15, wherein the target time-frequency resource block is one of the N time-frequency resource blocks that comprises time-frequency resources occupied by the first target signal, or, the target time-frequency resource block is one of the N1 time-frequency resource blocks that is of a minimum bandwidth.

19. The method according to claim 15, wherein any of the N1 time-frequency resource blocks comprises a positive integer number of time-frequency resource unit(s), and any two time-frequency resource units of the N1 time-frequency resource blocks are orthogonal in frequency domain; a first time-frequency resource block is one of the N time-frequency resource blocks that comprises time-frequency resources occupied by the first target signal, and the first time-frequency resource block comprises M1 time-frequency resource unit(s), and the time-frequency resources occupied by the first target signal belong to only M2 time-frequency resource unit(s) of the M1 time-frequency resource unit(s); a number of the time-frequency resource unit(s) comprised by the target time-frequency resource block and the frequency density of the first target signal are used to determine the M2 time-frequency resource unit(s) out of the M1 time-frequency resource unit(s); M1 is a positive integer, and M2 is a positive integer no greater than the M1.

20. The method according to claim 15, wherein any of the N1 time-frequency resource blocks comprises a positive integer number of time-frequency resource unit(s), and any two time-frequency resource units of the N1 time-frequency resource blocks are orthogonal in frequency domain; the N is greater than 1, a second time-frequency resource block and a third time-frequency resource block are any two time-frequency resource blocks of the N time-frequency resource blocks that are adjacent in frequency domain, the third time-frequency resource block being of a higher frequency than the second time-frequency resource block, and a second target signal and a third target signal are two first-type reference signals of the N first-type reference signals that are respectively transmitted in the second time-frequency resource block and the third time-frequency resource block; the second time-frequency resource block comprises S1 time-frequency resource units, while the time-frequency resources occupied by the second target signal belong to only S2 time-frequency resource units of the S1 time-frequency resource units; the third time-frequency resource block comprises T1 time-frequency resource unit(s), while the time-frequency resource block occupied by the third target signal belongs to only T2 time-frequency resource unit(s) of the T1 time-frequency resource unit(s); one of the S2 time-frequency resource units of a highest frequency and frequency density of the third target signal are used to determine the T2 time-frequency resource unit(s) out of the T1 time-frequency resource unit(s).

* * * * *